(12) United States Patent  
Hamada

(10) Patent No.: US 6,487,159 B1
(45) Date of Patent: Nov. 26, 2002

(54) DISC PLAYER

(75) Inventor: Makoto Hamada, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 116 days.

(21) Appl. No.: 09/585,473

(22) Filed: Jun. 2, 2000

(30) Foreign Application Priority Data

Jun. 2, 1999 (JP) .......................................... 11-155329

(51) Int. Cl.[7] .............................................. G11B 17/04
(52) U.S. Cl. .................................. 369/77.2; 360/99.06
(58) Field of Search .............................. 369/77.2, 77.1, 369/75.1; 360/99.06, 99.07, 99.02, 99.03

(56) References Cited

U.S. PATENT DOCUMENTS 6,081,494 A * 6/2000 Morimoto et al. ......... 369/75.2
6,262,961 B1 * 7/2001 Maeda et al. .............. 369/75.2
6,356,415 B1 * 3/2002 Kabasawa ................ 360/256.3
6,359,854 B1 * 3/2002 Nakanishi et al. ..... 369/178.01

FOREIGN PATENT DOCUMENTS

EP 0 779 620 A 6/1997
EP 0 833 323 A 4/1998

* cited by examiner

*Primary Examiner*—William Klimowicz
(74) *Attorney, Agent, or Firm*—McGinn & Gibb, PLLC

(57) ABSTRACT

A loading mechanism part for feeding a disc cartridge into a drive unit comprises a swing arm to be rotated by the drive of a rotation driving system, a loading arm provided in the drive unit to be rotated by the rotation of the swing arm, and a catch member provided in the drive unit for introducing the disc cartridge according to the rotation of the loading arm.

18 Claims, 23 Drawing Sheets

FIG. 14
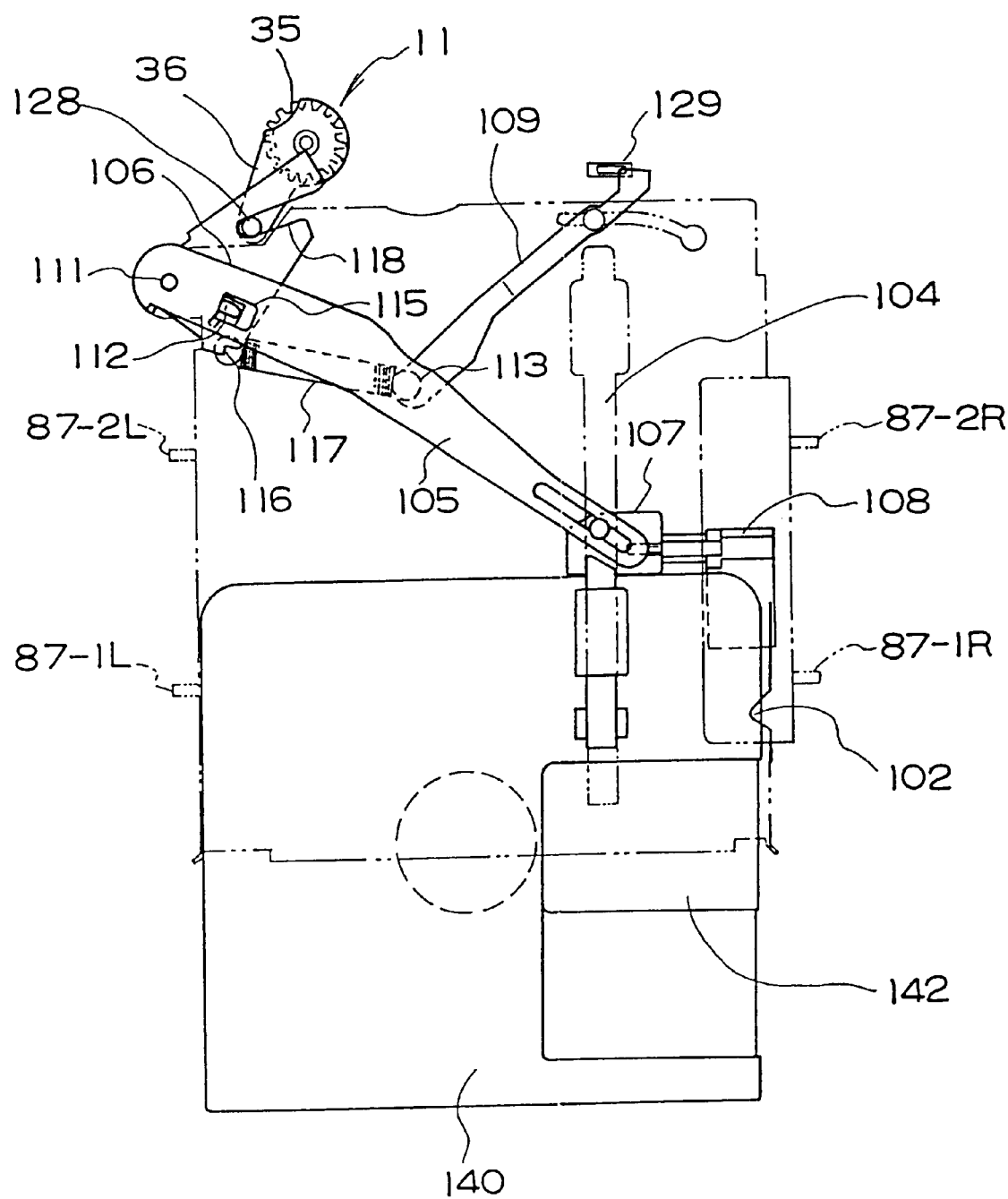

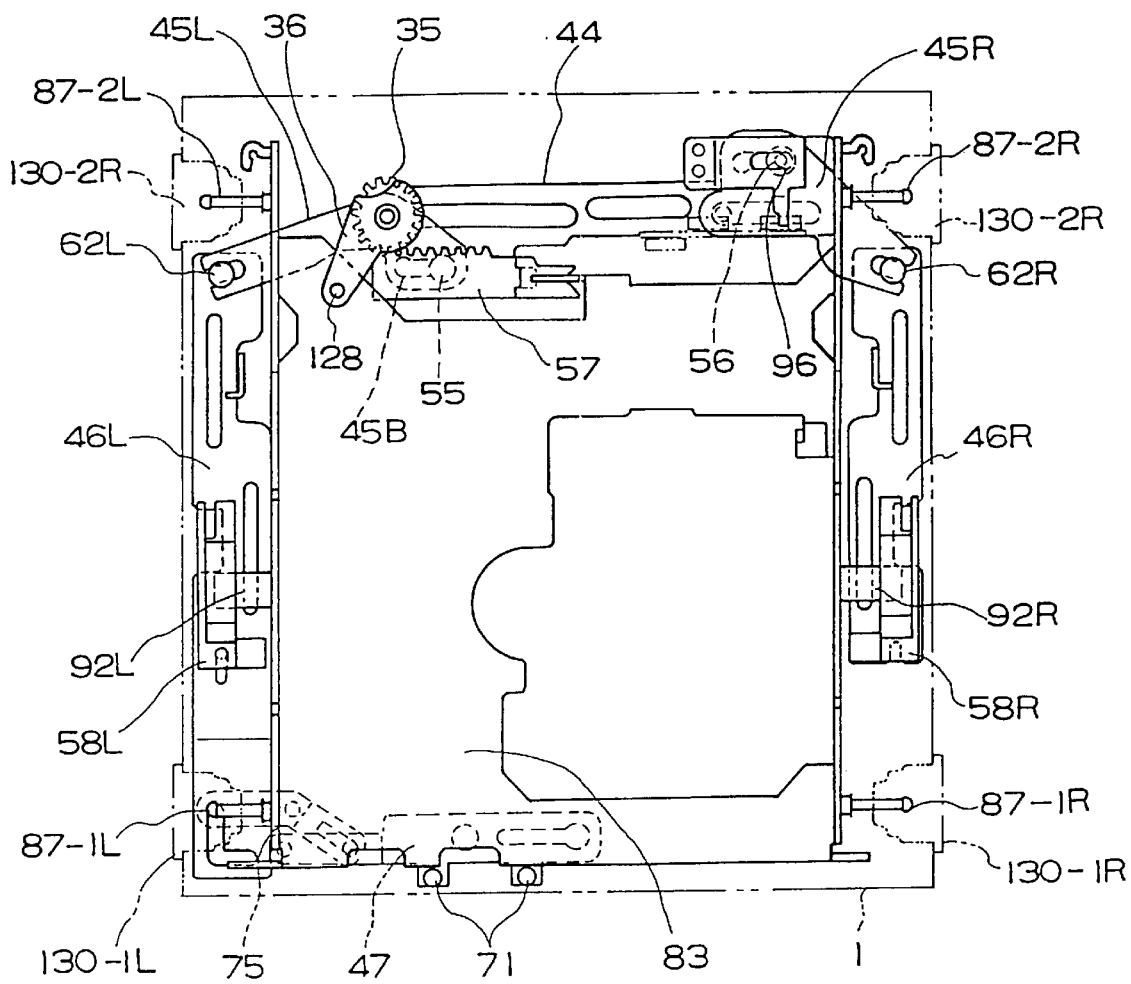

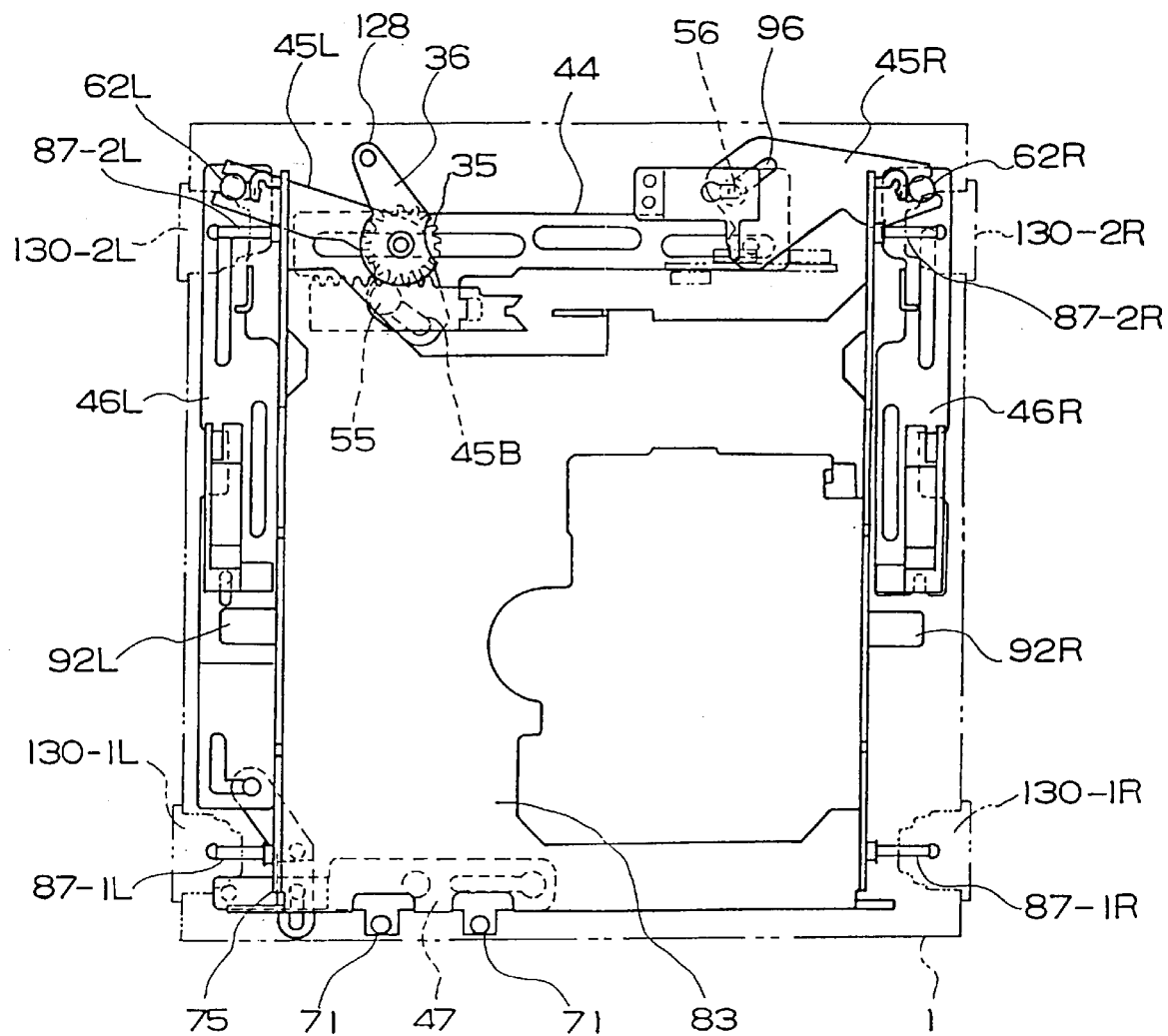

DISC PLAYER

BACKGROUND OF THE INVENTION

1. Field of the Invention

The present invention relates to a disc player for reproducing a record on a recording medium (mini disc) which holds information.

2. Description of the Related Art

Recently, a CD and a recording medium having a disc for recording information and being stored in a protection cartridge case, such as a mini disc cartridge (MD) of a photo magnetic recording system are highly demanded. Disc players for reproducing the discs, which have been developed in various forms, are required to have a thinner shape.

As such a disc player, those comprising a loading roller 151 for loading a disc cartridge 140 as shown in FIG. 26 can be presented. In order to achieve a thinner shape of the disc player, the driving system 160 of the loading roller 151 has been disposed at the left side to the back side with respect to a drive unit 153.

That is, the loading roller 151 and a rotation transmitting mechanism part 152 for driving the loading roller 151 are provided at the left side with respect to the drive unit 153, and a loading motor 154 and a gear row 155 are provided at the back side with respect to the drive unit 153 so that the output side of the loading motor 154 is linked with the loading roller 151 via the gear row 155 and the rotation transmitting mechanism part 152.

However, according to the conventional disc player, since the loading roller 151 is disposed at the left side with respect to the drive unit 153, the rotation transmitting system from the loading motor 154 as the driving source to the loading roller 151 (gear row 155 and the rotation transmitting mechanism part 152) needs to be provided from the back side of the drive unit 153 to the left side so that a problem arises in that a width size B of the disc player is bulky due to necessity of a large number of components and a complicated structure. Moreover, since the disc cartridge 140 is loaded according to the rotation drive of the loading roller 151, a problem is involved in that the loading speed cannot be higher than a certain speed due to generation of roller slip.

Furthermore, the floating lock of the drive unit 153 is executed by engagement of plates, which are rigid bodies in the conventional disc player. The lock by the rigid body plates cannot be provided without a certain degree of clearance. However, if the clearance is too large, the lock can be unstable due to frequent generation of backlash. In the case a buffer mechanism is added in order to avoid the inconvenience, a problem of increase of the number of components comes out.

SUMMARY OF THE INVENTION

In order to solve the aforementioned problems, an object of the invention is to provide a disc player, capable of providing a higher speed of loading a disc cartridge with a small number of components so as to achieve a simple structure and a smaller width size.

In order to achieve the object, according to a first aspect of the invention, there is provided a disc player comprising a drive unit including a drive plate having a record reproducing means, held by a base member via a floating means, and a cartridge holder held by the drive plate movably to the record reproducing means side, a loading means for moving the disc cartridge to the record reproducing means side by introducing a disc cartridge into the cartridge holder of the drive unit, an eject means for discharging the disc cartridge after reproducing the record in the disc cartridge, a lock means for locking the drive unit on the base member in the process from the reproduction of the record of the disc cartridge to the discharge of the disc cartridge, and a lock releasing means for releasing the lock by the lock means in loading the disc cartridge, wherein the loading means comprises a catch member for gripping the disc cartridge inserted in the cartridge holder, a loading arm for introducing the catch member for moving the disc cartridge to the record reproducing means side, and a swing arm to be rotated by the drive of a rotation driving system provided in the base member for rotating the loading arm as well as to be separated from the loading arm side when the loading operation of the disc cartridge is finished.

According to the configuration, when the disc cartridge is inserted into the cartridge holder of the drive unit, the disc cartridge is held by the catch member and the rotation driving system is driven so as to rotate the swing arm for rotating the loading arm according to the rotation of the swing arm so that the disc cartridge is introduced via the catch member for loading. Since the rotating swing arm is used for the rotating operation of the loading arm, the loading speed of the disc cartridge can be high. Moreover, since a roller for loading is not used, the loading motor and the rotation transmitting system (gear row and rotation transmitting mechanism part) for driving the roller for loading need not be provided from the back side to the left side with respect to the drive unit. Therefore, the structure can be simple as well as the width size of the disc player can be small with a small number of components.

Moreover, in order to achieve the object, according to a second aspect of the invention, there is provided the disc player according to the first aspect, wherein a gear fixed to the swing arm with the axis provided concentrically with the rotation center of the swing arm is linked with the output gear of the loading motor via a gear row so as to comprise the rotation driving system for the swing arm, with the swing arm and the rotation driving system disposed outward with respect to one side of the drive unit.

According to the configuration, the same effects as in the first aspect can be achieved as well as since the gear is adhered to the swing arm with the axis provided concentrically with the rotation center of the swing arm, backlash of the swing arm can be eliminated in the rotation driving system of the swing arm so that the operation error derived from the backlash of the swing arm can be eliminated. Moreover, since the swing arm and the rotation driving system are disposed outward with respect to one side of the drive unit, the width size of the disc player can be made smaller.

Furthermore, in order to achieve the object, according to a third aspect of the invention, there is provided the disc player according to the second aspect, wherein a notch part is provided in the swing arm for avoiding interference with respect to gears in the gear row.

According to the configuration, the same effects as in the first aspect can be achieved as well as since the notch part for avoiding the interference with respect to the gears in the gear row is provided in the swing arm, even after disposing the swing arm supported by a supporting part rotatably, by rotating the swing arm so as to have the notch part thereof oriented toward a supporting part supporting a gear in the gear row, the gear in the gear row can be supported by the supporting part without interference by the swing arm, and further, by rotating the swing arm so as to have the notch part thereof oriented toward another supporting part supporting another gear in the gear row, the other gear in the gear row can be supported by the other supporting part without interference by the swing arm, and thus the assembly operativity can be improved.

Moreover, in order to achieve the object, according to a fourth aspect of the invention, there is provided the disc player according to the first aspect, wherein the lock means comprises a plurality of peripheral lock means for locking the peripheral part of the drive unit, and an elastic lock means for pressing the entirety of the drive unit.

According to the configuration, the same effects as in the first aspect can be achieved as well as since the peripheral part (four side parts) of the drive unit can be locked by a plurality of (four) peripheral lock means as well as the entirety of the drive unit can be pressed by the elastic lock means in the case of locking the drive unit on the base member, the drive unit can be locked stably without backlash.

Furthermore, in order to achieve the object, according to a fifth aspect of the invention, there is provided the disc player according to the fourth aspect, wherein the peripheral lock means comprise a mode plate side lock part provided in a mode plate to be moved in the direction perpendicular to the loading direction of the disc cartridge according to the rotation of the swing arm so as to be engaged detachably with a lock part at the drive unit side when the mode plate is moved, one lock plate side lock part provided in one lock plate to be moved in the loading direction according to the movement of the mode plate so as to be engaged detachably with one side lock part at the drive unit side when the lock plate is moved, the other lock plate side lock part provided in the other lock plate to be moved in the loading direction according to the movement of the mode plate so as to be engaged detachably with the other side lock part at the drive unit side when the lock plate is moved, and a pressing member provided in a front lock plate to be moved in the direction perpendicular to the loading direction according to the movement of the lock plate for pressing the drive unit when the front lock plate is moved.

According to the configuration, the same effects as in the first aspect can be achieved as well as since the drive unit is pressed with the pressing member provided in the front lock plate, the mode plate side lock part is engaged detachably with the lock part at the back side with respect to the drive unit, the one lock plate side lock part is engaged detachably with the one side lock part of the drive unit, and the other lock plate side lock part is engaged detachably with the other side lock part of the drive unit in the case of locking the drive unit on the base member, the four sides of the drive unit can be locked, respectively, and thus the drive unit can be locked stably without backlash.

Moreover, in order to achieve the object, according to a sixth aspect of the invention, there is provided the disc player according to the fourth or fifth aspect, wherein the elastic lock means comprises a sub loading arm to be rotated by the rotation of the swing arm in the loading means, and a loading arm, mounted at the drive unit side rotatably by the same fulcrum, with the loading arm provided with a rotation tolerating means for tolerating a predetermined rotation with respect to the sub loading arm as well as with the tip side of the sub loading arm linked with the middle part of the loading arm via a spring member such that the sub loading arm can be rotated to the predetermined maximum rotation amount by the spring force of the spring member, interlocking with the loading arm.

According to the configuration, the same effects as in the first aspect can be achieved as well as the loading arm is rotated, interlocking with the sub loading arm according to the rotation of the swing arm of the loading means at the time of loading the disc cartridge such that the loading arm is stopped at the maximum rotation position but only the sub loading arm tensions the spring member by its rotation by the rotation tolerating means according to the further rotation of the swing arm. Because the sub loading arm and the loading arm are fixed with respect to the swing arm according to the tension of the spring member, the entirety of the drive unit can be pressed so that the drive unit can be locked stably without backlash.

BRIEF DESCRIPTION OF THE DRAWINGS

FIG. 14 is an explanatory diagram of the disc player during the loading operation.

FIG. 17 is an explanatory diagram for the lock operation of the drive unit in the disc player.

FIG. 18 is an explanatory diagram for the lock operation of the drive unit in the disc player.

DETAILED DESCRIPTION OF THE PRESENT INVENTION

Hereinafter an embodiment of the invention will be explained with reference to the drawings.

Figure 1:
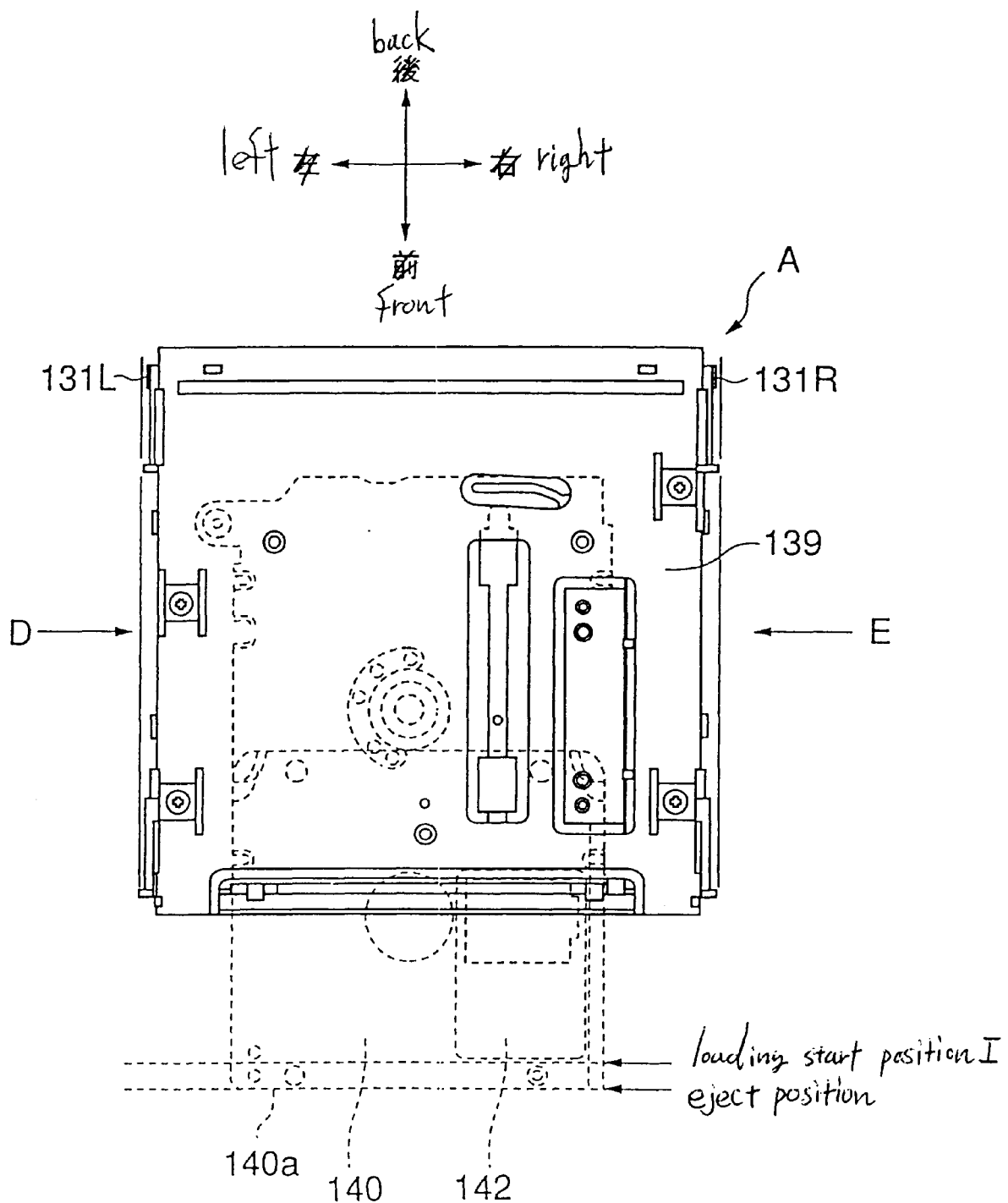
FIG. 1 is a plan view of a disc player according to the invention.
Figure 2:
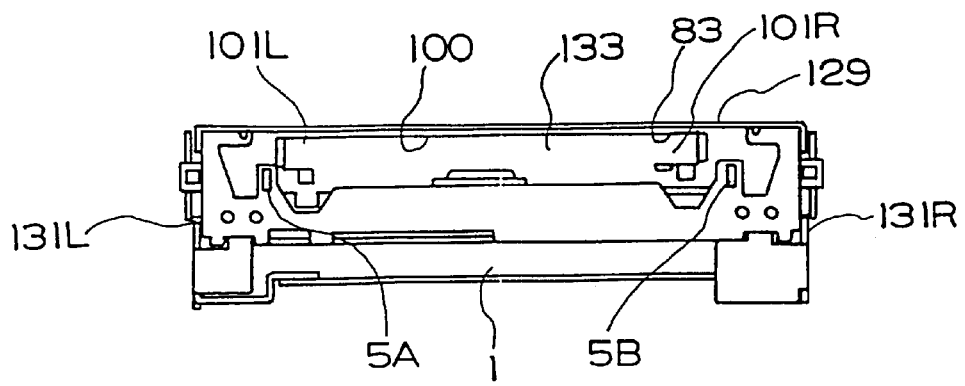
FIG. 2 is a front view of the disc player.
Figure 3:
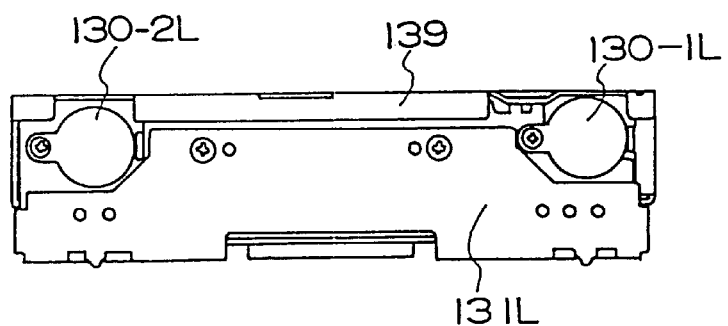
FIG. 3 is a side view viewed from the arrow D direction in FIG. 1.
Figure 4:
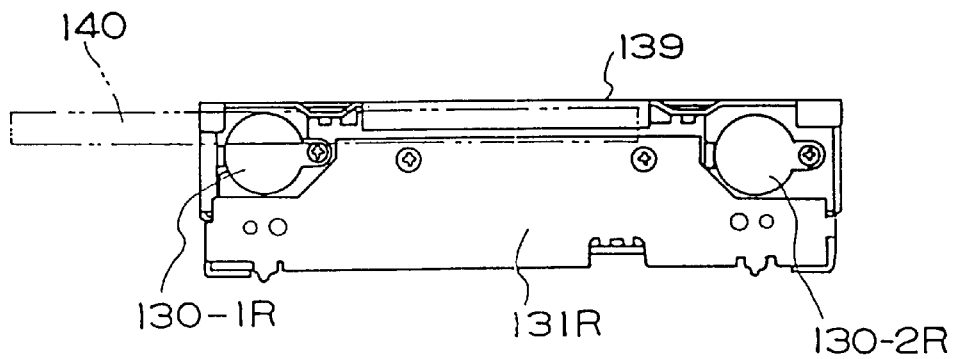
FIG. 4 is a side view viewed from the arrow E direction in FIG. 1.
Figure 5:
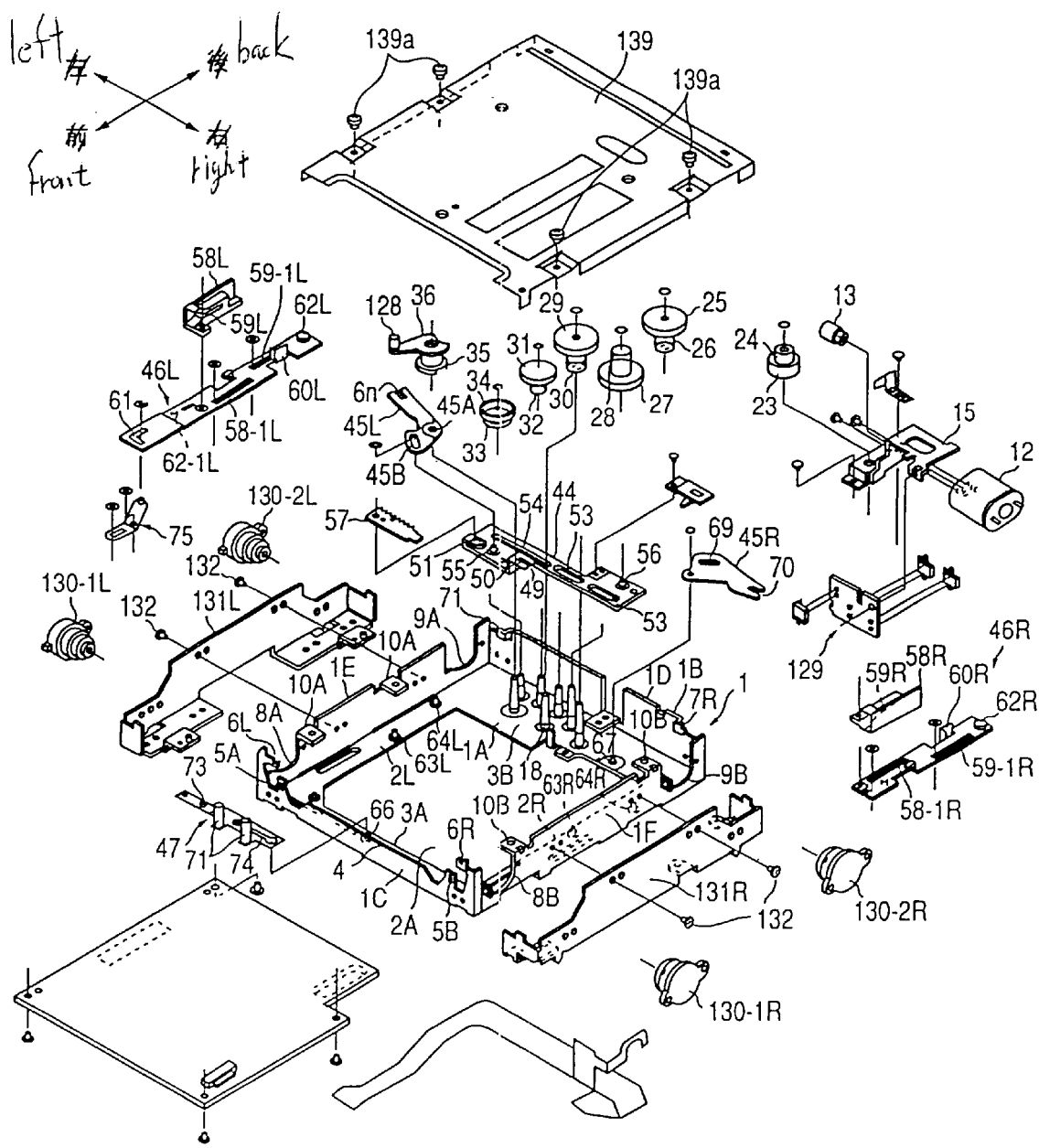
FIG. 5 is an exploded perspective view of the base frame unit of the disc player.
Figure 6:
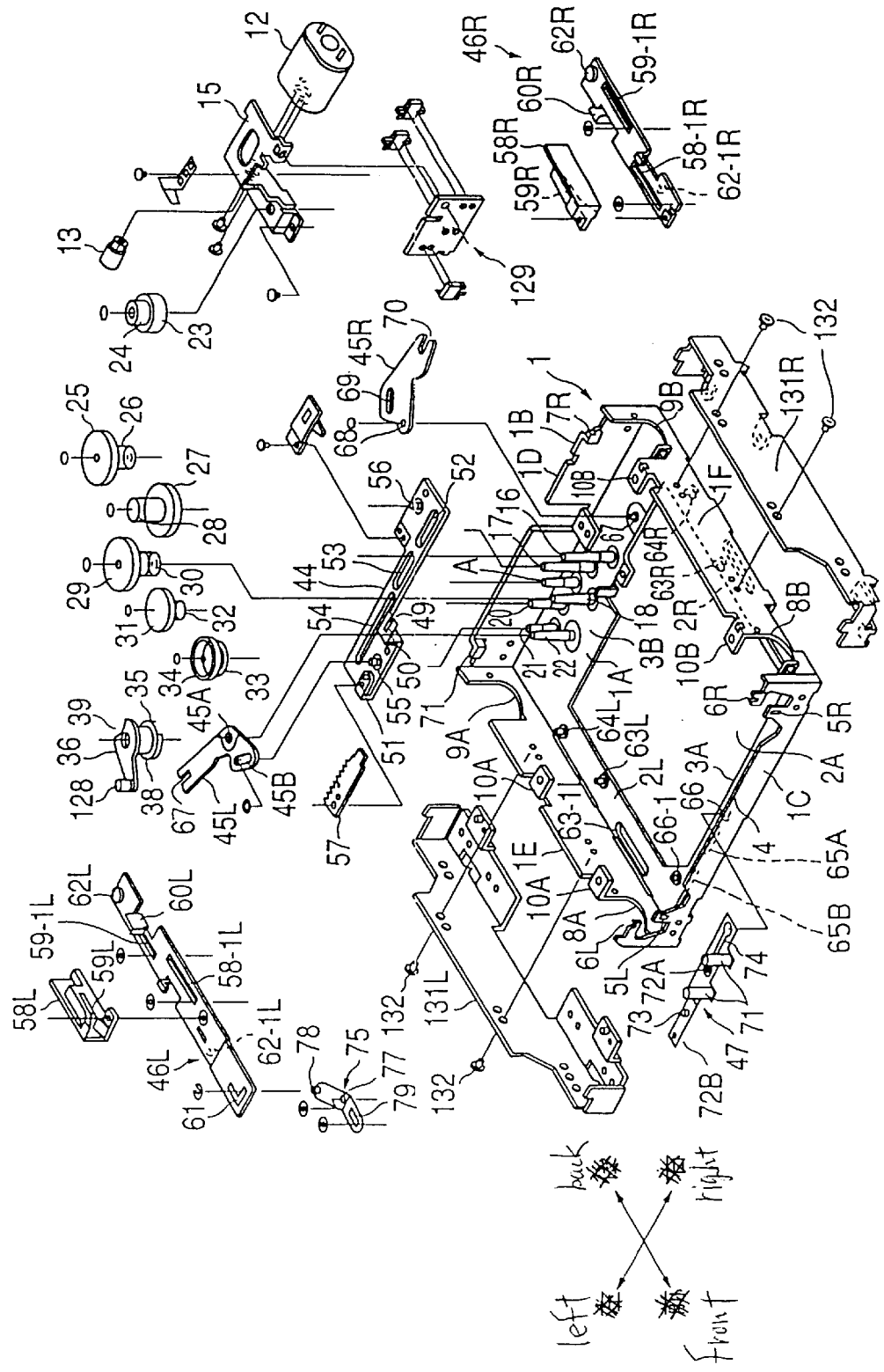
FIG. 6 is an enlarged exploded perspective view of the base frame structure of the disc player.

FIG. 1 is a plan view of a disc player according to the invention. FIG. 2 is a front view of the disc player FIG. 3 is a side view viewed from the arrow D direction in FIG. 1. FIG. 4 is a side view viewed from the arrow E direction in FIG. 1. FIG. 5 is an exploded perspective view of the base frame unit of the disc player. FIG. 6 is an enlarged exploded perspective view of the base frame structure of the disc player. In the drawings, the front side of the disc player is defined to be the front side, and the back side, and the right and left sides are set with respect to the front side as shown by the arrows.

The disc player A according to the invention comprises a drive unit 80 including a drive plate 81 having a record reproducing means 84, held by a base frame 1 as the base member via a floating means to be described later, and a cartridge holder 83 held by the drive plate 81 movably to the record reproducing means 84 side, a loading mechanism part 85 as the loading means for moving the disc cartridge 140 to the record reproducing means 84 side by introducing a disc cartridge 140 into the cartridge holder 83 of the drive unit 80, an eject means to be described later, for discharging the disc cartridge 140 after reproducing the record in the disc cartridge 140, a lock means to be described later, for locking the drive unit 80 on the base frame 1 in the process from the reproduction of the record of the disc cartridge 140 to the discharge of the disc cartridge 140, and a lock releasing means to be described later, for releasing the lock by the lock means in loading the disc cartridge 140.

As shown in FIGS. 5 and 6, the base frame 1 comprises a bottom surface part 1A, and a peripheral wall part 1B surrounding the bottom surface part 1A. The peripheral wall part 1B comprises front and back side wall parts 1C and 1D, and left and right wall parts 1E and 1F. An opening part 2A is formed in the bottom surface part 1A as well as lock plate mounting parts 2L and 2R are formed at the right and left sides with respect to the opening part 2A of the bottom surface part 1A. The front part of the bottom surface part 1A serves as a front lock plate mounting part 3A, and the back part of the bottom surface part 1A serves as a driving system mounting part 3B, respectively. Moreover, an insertion opening forming part 4 as well as stopping hole parts 5L and 5R and spring stopping parts 6L and 6R provided at the right and left sides with respect to the insertion opening forming part 4 are formed in the front side wall part 1C.

The left lock plate mounting part 2L is provided with slide pins 63L and 64L, and a slide hole part 63-1L. The right lock plate mounting part 2R is provided with slide pins 63R and 64R, and a slide hole part 63-1R. Moreover, the front lock plate mounting part 3A is provided with slide hole parts 65A and 65B, a slide pin 66, and a supporting pin 66-1.

Furthermore, spring stopping parts 7L and 7R are formed on the right and left sides in the upper rim part of the back side wall part 1D. Damper mounting parts 8A and 9A are formed on the front and back sides in the left side wall part 1E. Further, mounting seat parts 10A are formed on the front and back sides in the upper rim part of the left side wall part 1E. Damper mounting parts 8B and 9B are formed on the front and back sides in the right side wall part 1F. Moreover, mounting seat parts 10B are formed on the front and back sides in the upper rim part of the right side wall part 1F.

Figure 8:
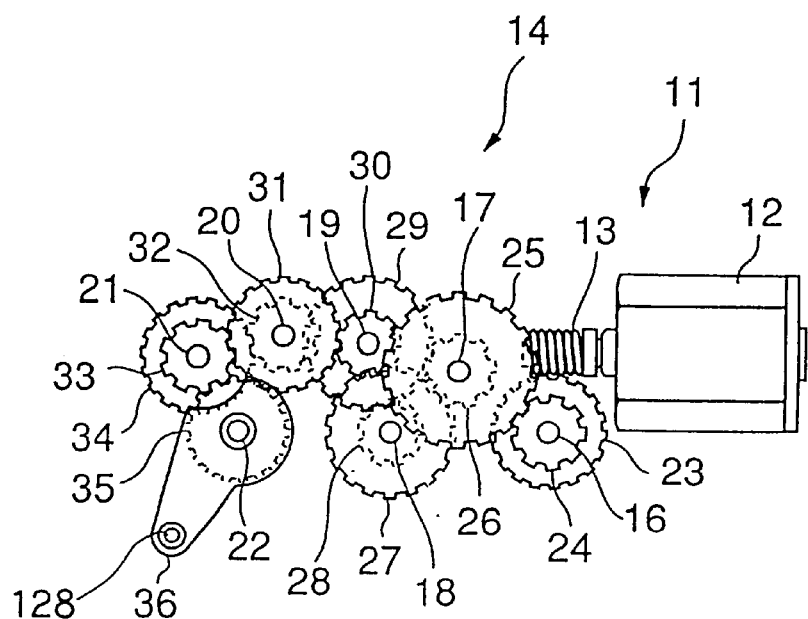
FIG. 8 is a plan view of the rotation driving system of the swing arm.

A rotation driving system 11 shown in FIG. 8 is mounted to the driving system mounting part 3. The rotation driving system 11 comprises a loading motor 12, and a gear row 14 linked with the output gear 13 of the loading motor 12. The loading motor 12, held via a holder 15 on the back side wall part 1D, is disposed in the driving system mounting part 3. A gap (not illustrated) is formed between the lower surface part of the loading motor 12 and the upper surface part of the driving system mounting part 3 for inserting a mode plate 44.

The gear row 14 has first to seventh gear supporting pins (supporting parts) 16 to 22 provided on the upper surface part of the driving system mounting part 3. First and second gears 23 and 24 integrally formed concentrically are supported rotatably by the first gear supporting pin 16. Third and fourth gears 25 and 26 integrally formed concentrically are supported rotatably by the second gear supporting pin 17.

Fifth and sixth gears 27 and 28 integrally formed concentrically are supported rotatably by the third gear supporting pin 18.

Moreover, seventh and eighth gears 29 and 30 integrally formed concentrically are supported rotatably by the fourth gear supporting pin 19. Ninth and tenth gears 31 and 32 integrally formed concentrically are supported rotatably by the fifth gear supporting pin 20. Eleventh and twelfth gears 33 and 34 integrally formed concentrically are supported rotatably by the sixth gear supporting pin 21. A swing arm 36 and a rack gear 35 integrally fixed to the swing arm 36 are supported rotatably by the seventh gear supporting pin 22.

The gears are disposed as follows: the output gear 13 of the loading motor 12 is engaged with the first gear 23, the second gear 24 is engaged with the third gear 25, the fourth gear 26 is engaged with the fifth gear 27, the sixth gear 28 is engaged with the seventh gear 29, the eighth gear 30 is engaged with the ninth gear 31, the tenth gear 32 is engaged with the eleventh gear 33, and the twelfth gear 34 is engaged with the rack gear 35, respectively.

Figure 9:
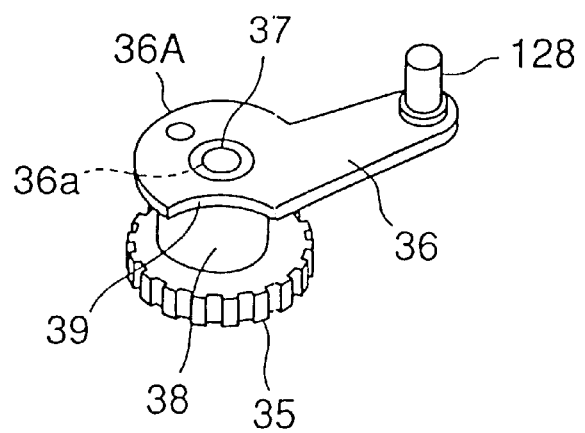
FIG. 9 is a perspective view of the swing arm.

The rack gear 35 includes a shaft part 38. The rack gear 35 and the swing arm 36 are provided as shown in FIG. 9. That is, by fitting a caulking pin 36 inserted through an inner hole 35a of the rack gear 35 into a hole part 36a provided in a base part 36A of the swing arm 36 and caulking the caulking pin 37, the swing arm 36 is set integrally in the shaft part 38 side of the rack gear 35. Furthermore, an arc-like notch part 39 is formed in the base part 36A of the swing arm 36, and a slide pin 128 is provided at the tip part of the swing arm 36.

Figure 10A:
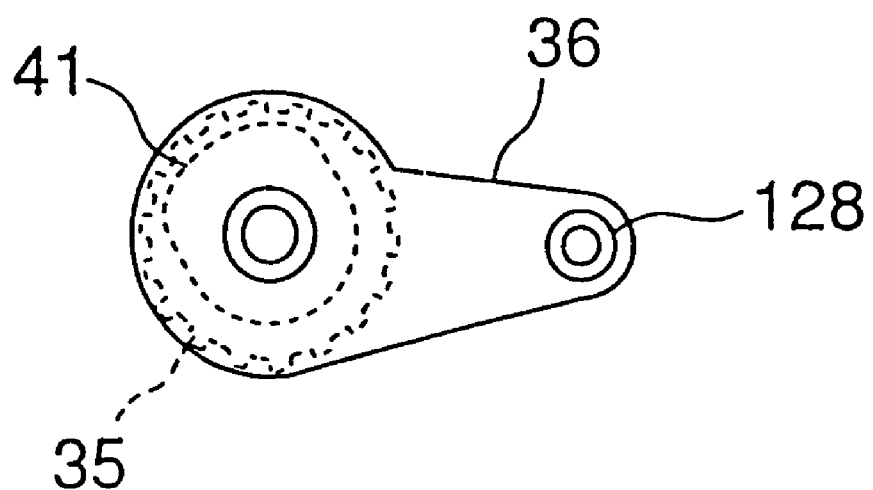
FIG. 10A is a plan view of another swing arm.
Figure 10B:
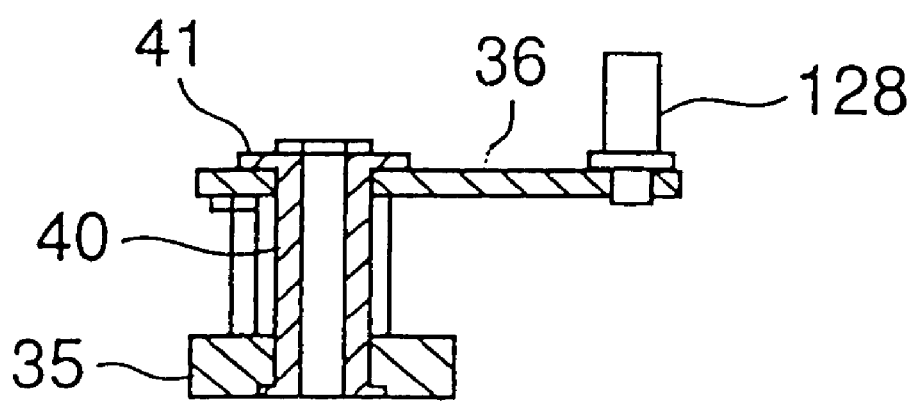
FIG. 10B is a cross-sectional view of the swing arm.

The rack gear 35 and the swing arm 36 can be assembled integrally by using a pin 40 and a washer 41 as shown in FIGS. 10A and 10B. In this case, however, the operation error may be caused due to generation of backlash of the swing arm 36 with respect to the rack gear 35. Therefore, in order to prevent such an inconvenience, the assembly is executed by caulking as mentioned above.

In the case the rack gear 35 and the swing arm 36 are integrated, the tenth gear 32 and the twelfth gear 34 cannot be assembled. However, since the arc-like notch part 39 is formed in the base part 36A of the swing arm 36 as mentioned above, even after having the rack gear 35 and the swing arm 36 supported by the seventh gear supporting pin 22, by orienting the notch part 39 toward the fifth gear supporting pin 20 side by rotating the swing arm 36, the fifth gear supporting pin 20 can be inserted through the ninth and tenth gears 31 and 32. Then, by rotating the swing arm 36 such that the notch part 39 is oriented toward the sixth gear supporting pin 21 side, the sixth gear supporting pin 21 can be inserted through the eleventh and twelfth gears 33 and 34.

The lock mechanism part 43 comprises the mode plate 44, left and right lock links 45L and 45R, left and right lock plates 46L and 46R, a front lock plate 47, and an interlocking link 75.

A lock nail part (mode plate side lock part) 50 having a lock groove part 49, a rack mounting part 51, long hole-like guide holes 52, 53 and 54, and shaft pins 55 and 56 are formed in the mode plate 44. Moreover, a rack plate 57 is fixed to the rack mounting part 51. The mode plate 44 is disposed in the driving system mounting part 3 with the second, fourth, and fifth gear supporting pins 17, 19 and 20 inserted through the guide holes 52, 53 and 54 thereof, movably in the right and left direction. The rack plate 57 is engaged with the rack gear 35.

Moreover, a left lock block 58L is fixed to the left (one) lock plate 46L. A left lock groove part 59L opened toward the front side is formed in the lock block 58L. These components comprise a lock plate side lock part at one side. Furthermore, long hole-like guide holes 58-1L, 59-1L along the front and back direction, and a projection part 60L are provided in the left lock plate 46L. An L-shaped sliding hole part 61 is formed in the front part of the left lock plate 46L as well as slide pins 62-1L and 62L are formed in the middle part and the back part, respectively.

Moreover, a right lock block 58R is fixed to the right (other) lock plate 46R. A right lock groove part 59R opened toward the front side is formed in the lock block 58R. These components comprise a lock plate side lock part at the other side. Furthermore, long hole-like guide holes 58-1R and 59-1R along the front and back direction, and a projection part 60R are provided in the right lock plate 46R. Slide pins 62-1R and 62R are formed in the middle part and the back part of the right lock plate 46R, respectively.

The left lock plate 46L is disposed on the left lock plate mounting part 2L movably in the front and back direction (disc cartridge loading direction) by inserting the slide pins 63L, 64L into the guide holes 58-1L and 59-1L as well as inserting the slide pin 62-1L into the slide hole part 63-1L, respectively. Moreover, the right lock plate 46R is disposed on the right lock plate mounting part 2R movably in the front and back direction by inserting the slide pins 63R and 64R into the guide holes 58-1R and 59-1R as well as inserting the slide pin 62-1R into the slide hole part 63-1R, respectively.

The left lock link 45L is provided with a fulcrum hole part 45A in the bent part thereof, a slide hole part 45B on one end part, and an inserting groove part 67 on the other end part, respectively. The left lock link 45L is mounted on the driving system mounting part 3 rotatably by fitting the seventh gear supporting pin 22 into the fulcrum hole part 45A.

Moreover, the slide pin 55 of the mode plate 44 is fitted in the slide hole part 45B slidably. Furthermore, the slide pin 62L of the left lock plate 46L is inserted in the inserting groove part 67 slidably.

The right lock link 45R is provided with a fulcrum hole part 68 in the bent part thereof, a slide hole part 69 on one end part, and an inserting groove part 70 on the other end part, respectively. The right lock link 45R is mounted on the driving system mounting part 3 rotatably by fitting the slide pin 67 provided in the driving system mounting part 3 into the fulcrum hole part 68. Moreover, the slide pin 56 of the mode plate 44 is fitted in the slide hole part 66 slidably. Furthermore, the slide pin 62R of the right lock plate 46R is inserted in the inserting groove part 70 slidably.

The front lock plate 47 holds two lock pins 71 as pressing members with a predetermined interval in the right and left direction. Moreover, the front lock plate 47 is provided with slide pins 72A and 72B projecting to the rear side thereof, a slide pin 73 projecting to the surface side, and a long hole-like slide hole part 74 along the right and left direction. The front lock plate 47 is mounted on the front lock plate mounting part 3A movably in the right and left direction by fitting the slide pins 72A and 72B in the slide hole parts 65A and 65B, and fitting the slide pin 66 in the slide hole part 74 slidably.

The left lock plate 46L and the front lock plate 47 are interlocked by the interlocking link 75. The interlocking link 75 with an L-shape has a hole part 77 in the bent part thereof. And further, it is provided with a slide pin 78 on one end part as well as a slide hole part 79 on the other end part. The interlocking link 75 is provided on the left end part of the front lock plate mounting part 3A rotatably by mounting the supporting pin 66-1 provided in the front lock plate mounting part 3A in the hole part 77 rotatably. The slide pin 78 of the interlocking link 75 is fitted in the sliding hole part 61 of the left lock plate 46L slidably. Moreover, the slide pin 73 of the front lock plate 47 is fitted in the slide hole part 79 of the interlocking link 75 slidably.

Dampers 130-1L and 130-2L are mounted on the damper mounting parts 8A and 9A, and dampers 130-1R and 130-2R are mounted on the damper mounting parts 8B and 9B, respectively. Brackets 131L and 131R are mounted on the left and right side wall parts 1E and 1F of the base frame 1 by a screw member 132. The brackets 131L and 131R are for mounting the disc player A optionally to another substance, and thus they are not essential.

Figure 7:
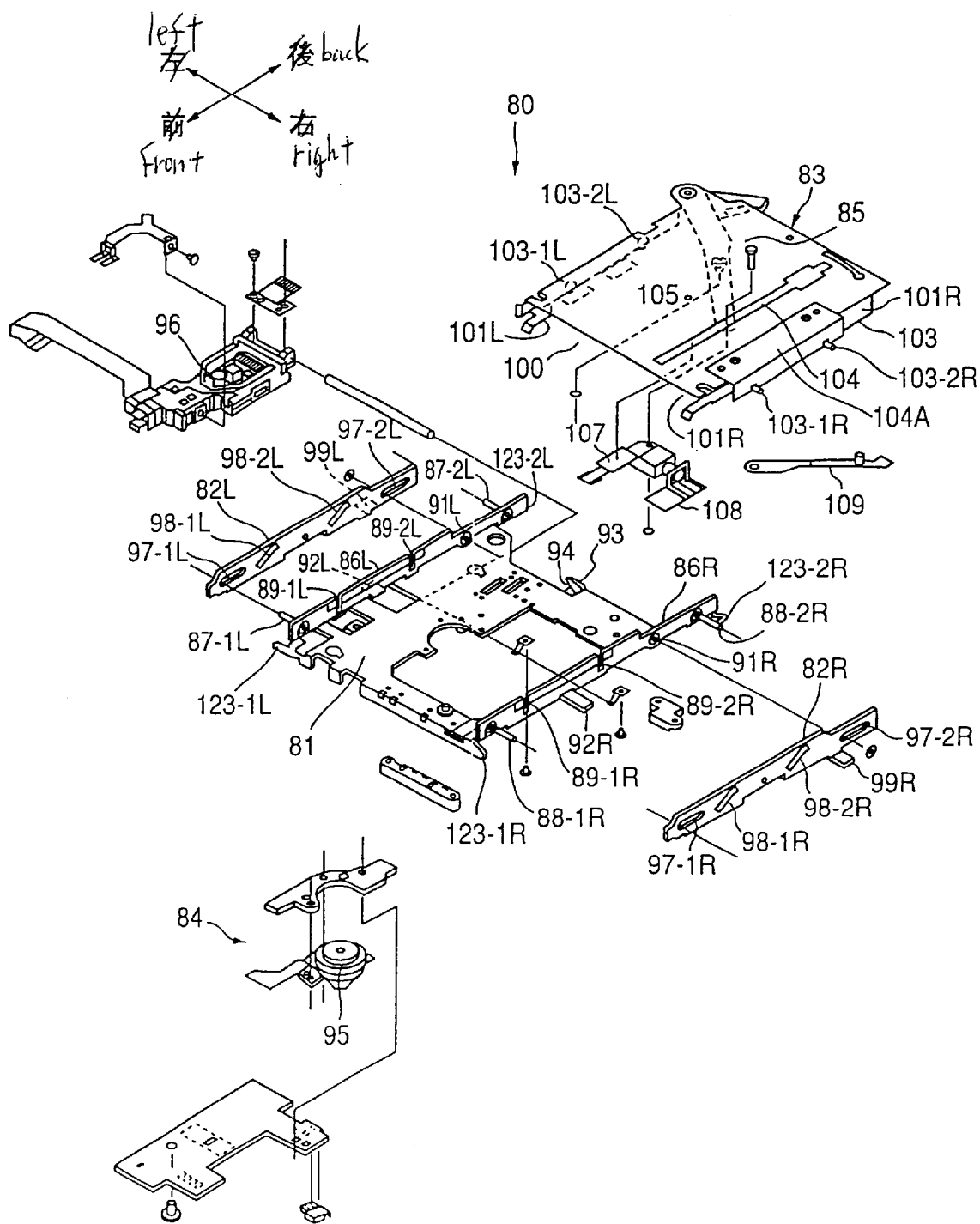
FIG. 7 is an exploded perspective view of the drive unit of the disc player.

As shown in FIG. 7, the drive unit 80 comprises the drive plate 81, left and right slide plates 82L and 82R, and the cartridge holder 83. The record reproducing means 84 is mounted on the drive plate 81. The loading mechanism part 85 as the loading means is mounted on the cartridge holder 83.

The drive plate 81 includes left and right side wall parts 86L and 86R. The left side wall part 86L is provided with holding pins 87-1L and 87-2L projecting outward, in the front and back parts thereof. The right side wall part 86R is provided with holding pins 88-1R and 88-2R projecting outward, in the front and back parts thereof. Furthermore, slits 89-1L and 89-2L are formed in the front and back parts of the left side wall part 86L from the upper rim part to the downward direction as well as slits 89-1R and 89-2R are formed in the front and back parts of the right side wall part 86R from the upper rim part to the downward direction. The back part of the left side wall part 86L is provided with a slide pin 91L, and the back part of the right side wall part 86R is provided with a slide pin 91R.

Left and right locked nail parts 92L and 92R as one and the other side lock parts are provided, projecting horizontally outward from the middle part of the lower rim part of the left and right side wall parts 86L and 86R of the drive plate 81. Moreover, a back side locked nail part 93 as a lock part is provided on the back rim part of the drive plate 81. The back side locked nail part 93 is oriented in the vertical direction (up and down direction), with an engaging groove part 94 formed on the tip end part thereof.

The record reproducing means 84 is provided on the surface part of the drive plate 81. The record reproducing means 84 comprises a turn table 95 and an optical pickup 96.

The optical pickup 96 can be moved in the radial direction of the disc cartridge 140 according to a screw feeding mechanism (not illustrated).

As shown in FIG. 7, the left slide plate 82L includes front and back side slide hole parts 97-1L and 97-2L, and front and back side elevating slide hole parts 98-1L and 98-2L. Furthermore, a lever part 99L is provided, projecting from the back part of the lower rim part of the left slide plate 82L. As shown in FIG. 7, the right slide plate 82R includes front and back side slide hole parts 97-1R and 97-2R, and front and back side elevating slide hole parts 98-1R and 98-2R. Moreover, a lever part 99R is provided, projecting from the back part of the lower rim part of the right slide plate 82R.

The left slide plate 82L is mounted on the outer side of the left side wall part 86L of the drive plate 85 movably in the front and back direction and in the up and down direction, with the holding pin 87-1L inserted slidably through the front side slide hole part 97-1L and the slide pin 91L inserted slidably through the back side slide hole part 97-2L. The left slide plate 82L is forced backward by a left spring member 122L.

Figure 19A:
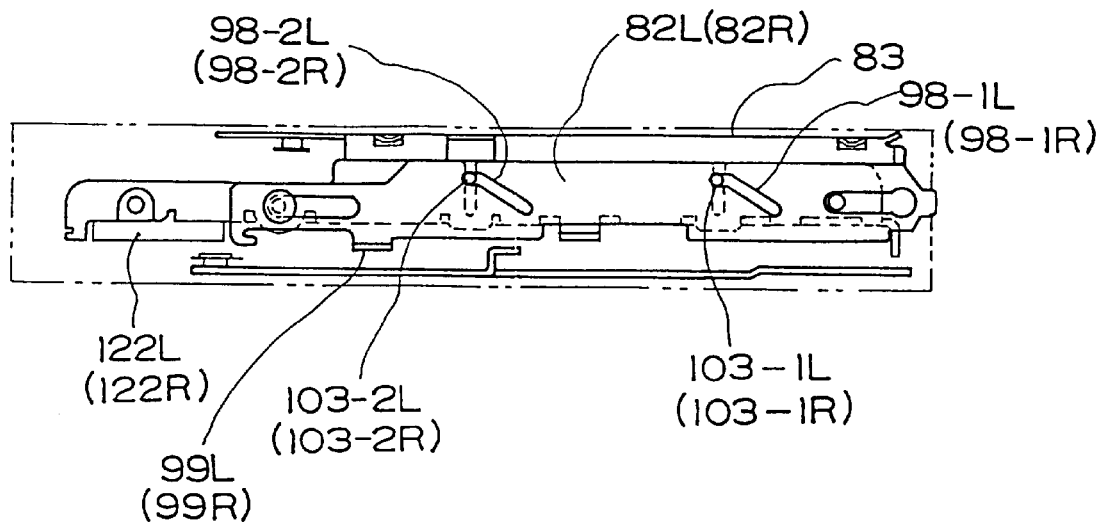
FIGS. 19A and 19B are explanatory diagrams for the operation of the slide plate in the disc player.
Figure 19B:
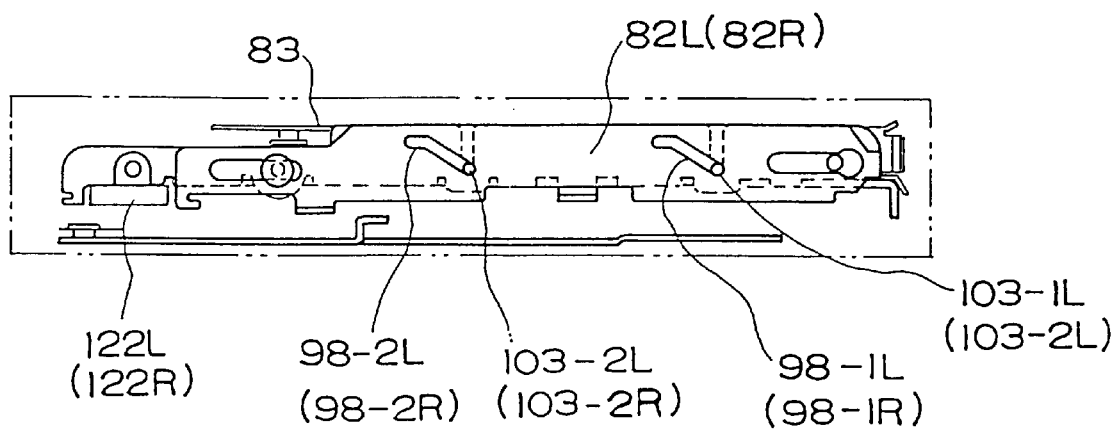

The right slide plate 82R is mounted on the outer side of the right side wall part 86R of the drive plate 85 movably in the front and back direction and in the up and down direction, with the holding pin 87-1R inserted slidably through the front side slide hole part 97-1R and the slide pin 91R inserted slidably through the back side slide hole part 97-2R. The right slide plate 82R is forced backward by a right spring member 122R (see FIG. 19).

Figure 13:
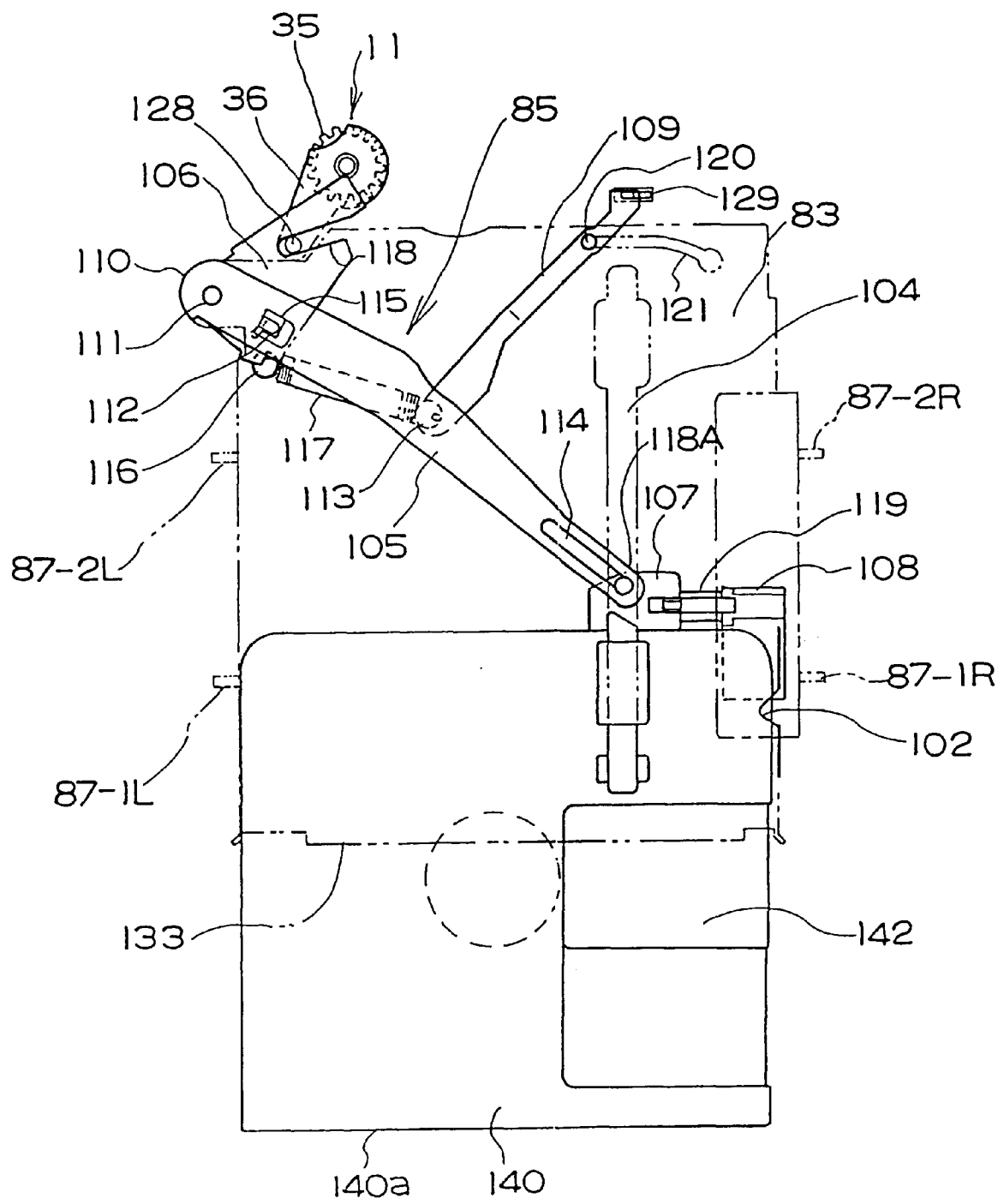
FIG. 13 is an explanatory diagram of the disc player at the time of starting the loading operation.

As shown in FIGS. 7 and 13, the cartridge holder 83 has a cartridge insertion opening forming part 100 in the front surface thereof. Guide parts 101L, 101R are formed on the left and right side parts of the cartridge insertion opening forming part 100 along the front and back direction. A nail 102 is provided on the upright wall part of the right side guide part 101R for releasing the shutter of a mini disc MD as the cartridge 140. Moreover, the lower rim part of the upright wall part of the right side guide part 101R serves as a slide guide 103. A hole-like slide guide 104 is formed in the right side of the surface part of the cartridge holder 83 in the front and back direction.

The cartridge holder 83 is provided with left guide pins 103-1L and 103-2L, projecting from the front and back parts of the upright wall part of the left side guide part 101L. Further, the cartridge holder 83 is provided with a pin holder part 104A outside the right side guide part 101R, with right guide pins 103-1R and 103-2R, projecting from the front and back parts with respect to the pin holder part 104A.

The loading mechanism part 85 is provided on the inner surface side of the cartridge holder 83. As shown in FIG. 13, the loading mechanism part 85 comprises a loading arm 105, a sub loading arm 106, a slider 107, a catch member 108, and a switch link 109.

The base end part of the loading arm 105 and the base end part of the sub loading arm 106 are mounted rotatably on the supporting part 110 provided on the left back end part of the cartridge holder 83 by a supporting pin 111. The loading arm 105 is provided with a stopper part 112 cut up at the base part thereof, a pin 113 at the middle part, and a slide hole part 114 at the tip end part. Moreover, a hole part 115, and a spring stopping part 116 are provided at the base part of the sub loading arm. The sub loading arm 106 with the stopper part 112 inserted in the hole part 115 thereof with play, is superimposed on the loading arm 105. The sub loading arm 106 is forced leftward by a spring member 117 provided across the spring stopping part 116 and the pin 113. The hole part 115, the stopper part 112, the spring stopping part 116, the pin 113, and the spring member 117 comprise a rotation tolerating means. Moreover, a slit-like engaging part 118 is formed at the tip end side in the sub loading arm 106.

The slider 107 is mounted on the slide guide 104 of the cartridge holder 83 slidably. The slider 107 is provided with a slide pin 118A such that the slider 107 is linked with the tip side of the loading arm 105 with the slide pin 118A inserted in the slide hole part 114. Further, the slider 107 is interlocked with the catch member 108 by an interlocking member 119. The catch member 108 is mounted on the slide guide 103 of the loading arm 105 slidably.

The base end part of the switch link 109 is interlocked rotatably with the pin 113 at the middle part of the loading arm 105. The switch link 109 is provided with a guide pin at the tip part, with the guide pin 120 inserted in an arc-like guide hole part 121 of the cartridge holder 83 slidably.

The cartridge holder 83 with the configuration is assembled with the drive plate 81. That is, the cartridge holder 83 is mounted on the drive plate 81 with the left guide pins 103-1L and 103-2L inserted in the front and back slits 89-1L, 89-2L of the left side wall part 86L of the drive plate 81 as well as the left guide pins 103-1L and 103-2L each inserted in the front and back side elevating slide hole parts 98-1L and 98-2L of the left slide plate 82L slidably, and the right guide pins 103-1R and 103-2R inserted in the front and back slits 89-1R and 89-2R of the right side wall part 86R of the drive plate 81 as well as the right guide pins 103-1R and 103-2R each inserted in the front and back side elevating slide hole parts 98-1R and 98-2R of the right slide plate 82R slidably so as to provide the drive unit 80 therewith.

Figure 11A:
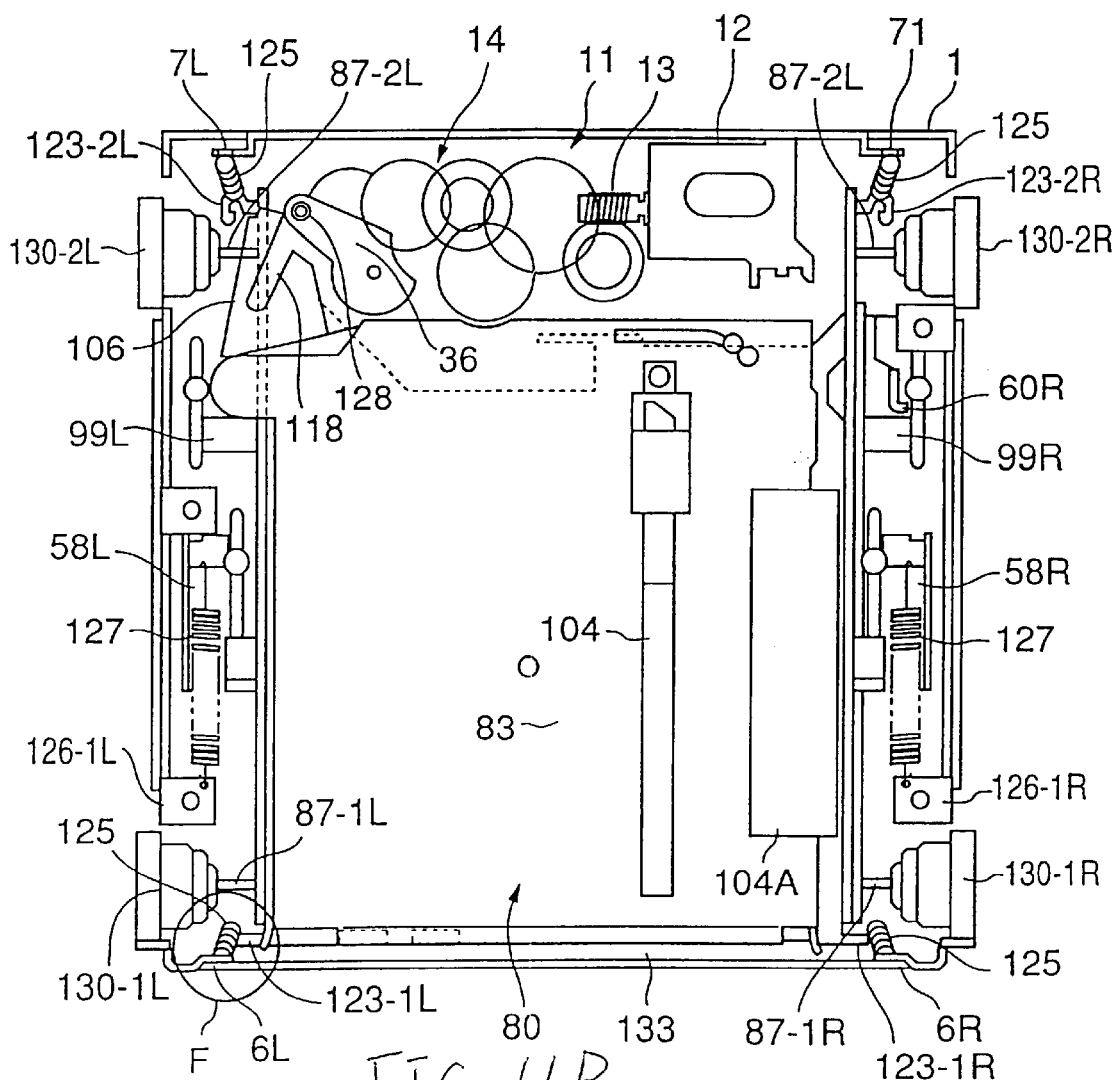
FIG. 11A is a plan view of the disc player according to the invention with the cover member detached therefrom.
Figure 11B:
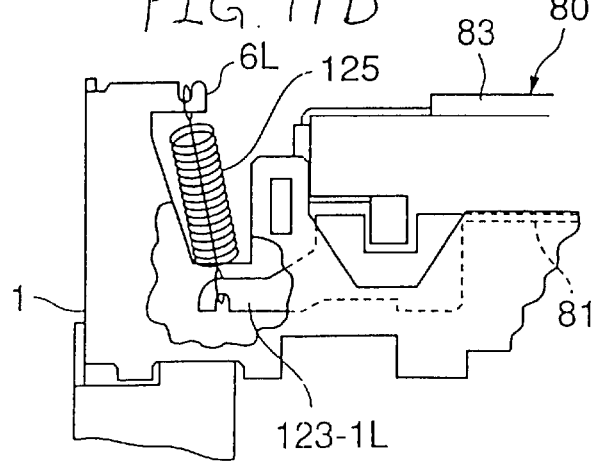
FIG. 11B is an explanatory side view of the F part of FIG. 11A.

The drive unit 80 is assembled with the base frame 1 via the floating means. That is, as shown in FIGS. 11A and 11B, the left holding pins 87-1L and 87-2L of the drive plate 81 in the drive unit 80 are held by the left front and back dampers 130-1L and 130-2L of the base frame 1 as well as the right holding pins 87-1R and 87-2R of the drive plate 81 in the drive unit 80 are held by the right front and back dampers 130-1R and 130-2R of the base frame 1. A suspending spring member 125 is placed across spring stopping parts 123-1L, 123-2L, 123-1R and 123-2R provided in the front and back sides in the left and right side parts of the drive plate 81 and the spring stopping parts 6L, 7L, 6R and 7R provided in the front and back sides in the left and right side parts of the base frame 1. Accordingly, the drive unit 80 is assembled with the base frame 1 in the floating state.

In this case, the cartridge insertion opening forming part 100 on the front surface of the cartridge holder 83 and the insertion opening forming part 4 of the base frame 1 provide a cartridge insertion opening 133.

Further, a spring member 127 is placed across spring stopping parts 126-1L and 126-1R provided in the front part of the left and right side parts of the base frame 1 and the left and right lock blocks 58L and 58R. As shown in FIG. 13, a slide pin 128 of the swing arm 36 is inserted in the slit-like engaging part 118 at the tip end side of the sub loading arm 106 slidably. The lever parts 99L and 99R of the left and right slide plates 82L and 82R are contacted with the front rim part of the projection parts 60L and 60R of the left and right lock plates 46L and 46R. Moreover, the tip end part (back end part) of the switch link 109 is slidably contacted with a start detection switch 129. A cover member 139 is mounted on the upper part of the base frame 1 by a screw member 139a, using the mounting seat parts 10A and 10B.

The lock means comprise four peripheral lock means for locking the peripheral part of the drive unit 80, and an elastic lock means for pressing the entirety of the drive unit 80.

The peripheral lock means comprise the lock nail part 50 as the mode plate side lock part provided in the mode plate 44 to be moved in the direction perpendicular to the loading direction of the disc cartridge 140 according to the rotation of the swing arm 36 so as to be engaged detachably with the back side locked nail part 93 provided in the drive unit 80 side when the mode plate 44 is moved, the lock block 58L as the one lock plate side lock part provided in the left lock plate 46L to be moved in the loading direction according to the movement of the mode plate 44 so as to be engaged detachably with the left side locked nail part 92L as the one side lock part provided in the drive unit 80 side when the lock plate 46L is moved, the lock block 58R as the other lock plate side lock part provided in the right lock plate 46R to be moved in the in the loading direction according to the movement of the mode plate 44 so as to be engaged detachably with the right side locked nail part 92R as the other side lock part provided in the drive unit 80 side when the lock plate 46R is moved, and the lock pin 71 provided in the front lock plate 47 to be moved in the right and left direction (direction perpendicular to the loading direction) according to the movement of the lock plate 46L so as to press the back part of the drive unit 80 when the front lock plate 47 is moved.

The elastic lock means comprises the sub loading arm 106 to be rotated according to the rotation of the swing arm 36, and the loading arm 105, mounted rotatably on the cartridge holder 83 side at the same fulcrum. The loading arm 105 is provided with the rotation tolerating means for tolerating a predetermined rotation with respect to the sub loading arm 106. The tip side of the sub loading arm 106 is linked with the middle part of the loading arm 105 via the spring member 117 such that the sub loading arm 106 is rotated to the predetermined maximum rotation amount by the spring force of the spring member 117, interlocking with the loading arm 105.

The eject operation of the disc cartridge 140 is executed by the reverse operation with respect to the loading operation, and thus the loading mechanism part 85 as the loading means serves also as the eject means. Moreover, the lock release by the lock releasing means is executed by the reverse operation with respect to the lock operation.

The operation of the disc player with the above-mentioned configuration will be explained.

(Loading Operation) (Lock Releasing Operation)

As shown in FIG. 13, the disc cartridge 140 accommodating a mini disc MD is inserted into the cartridge insertion opening 133. At the time, the shutter releasing nail 102 is engaged with a shutter 142 of the disc cartridge 140 so that the disc cartridge 140 is caught by the catch member 108.

By further pushing in the disc cartridge 140, the end part 140a of the disc cartridge 140 is disposed at a loading start position I as shown in FIG. 1. In this case, since the catch member 108 is pushed in so as to rotate the loading arm 105 in the counterclockwise direction and rotate the switch link 109 in the clockwise direction, the tip end part of the switch link 109 turns on the start detection switch 129.

Figure 12:
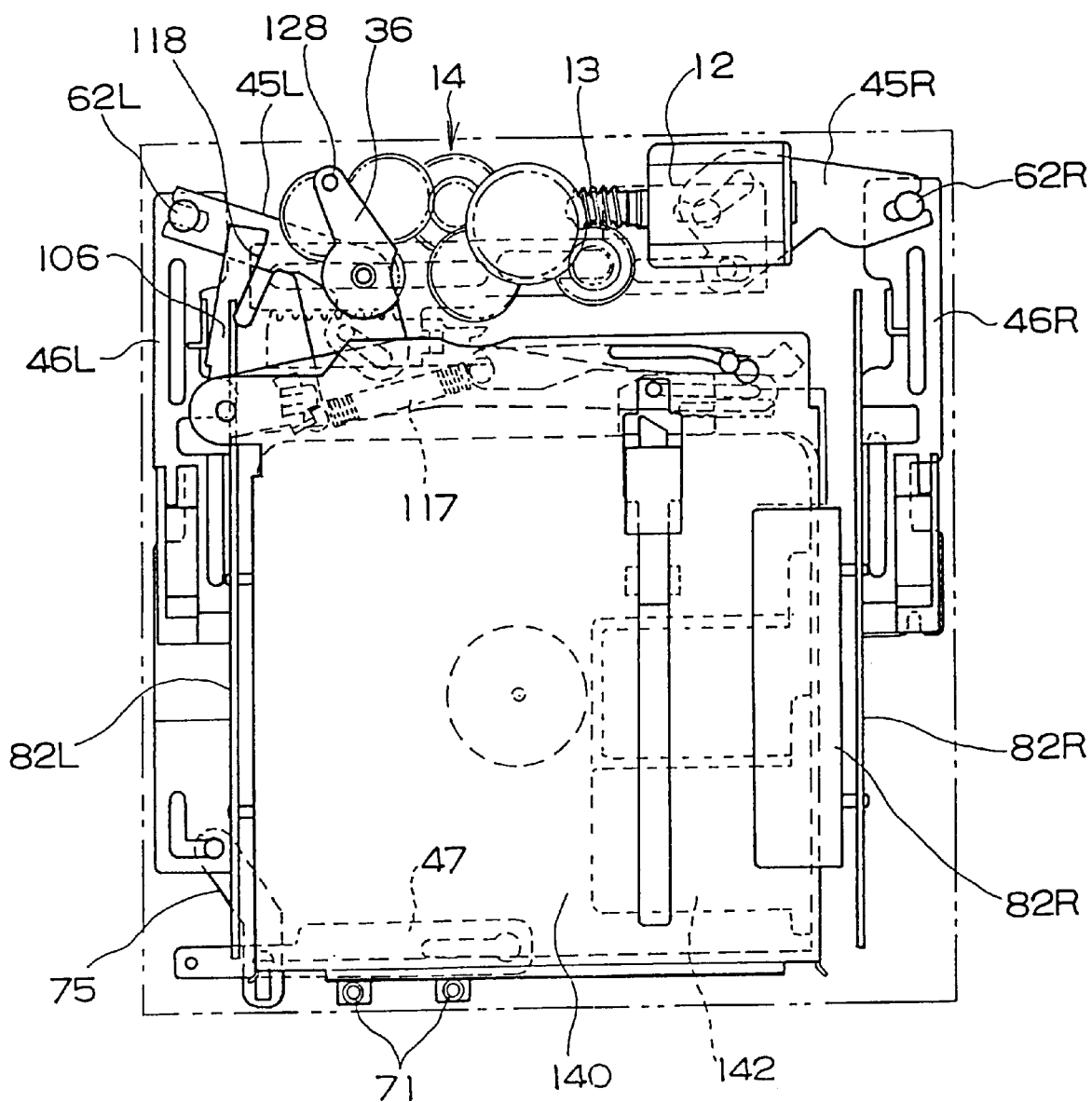
FIG. 12 is an explanatory diagram of the disc player according to the invention after completion of the loading operation.

According to the on operation of the start detection switch 129, as shown in FIGS. 12 and 14, the loading motor 12 in the rotation driving system 11 is rotated so that the swing arm 36 is rotated in the clockwise direction via the gear row 14 linked with the output gear 13 of the loading motor 12.

Figure 15:
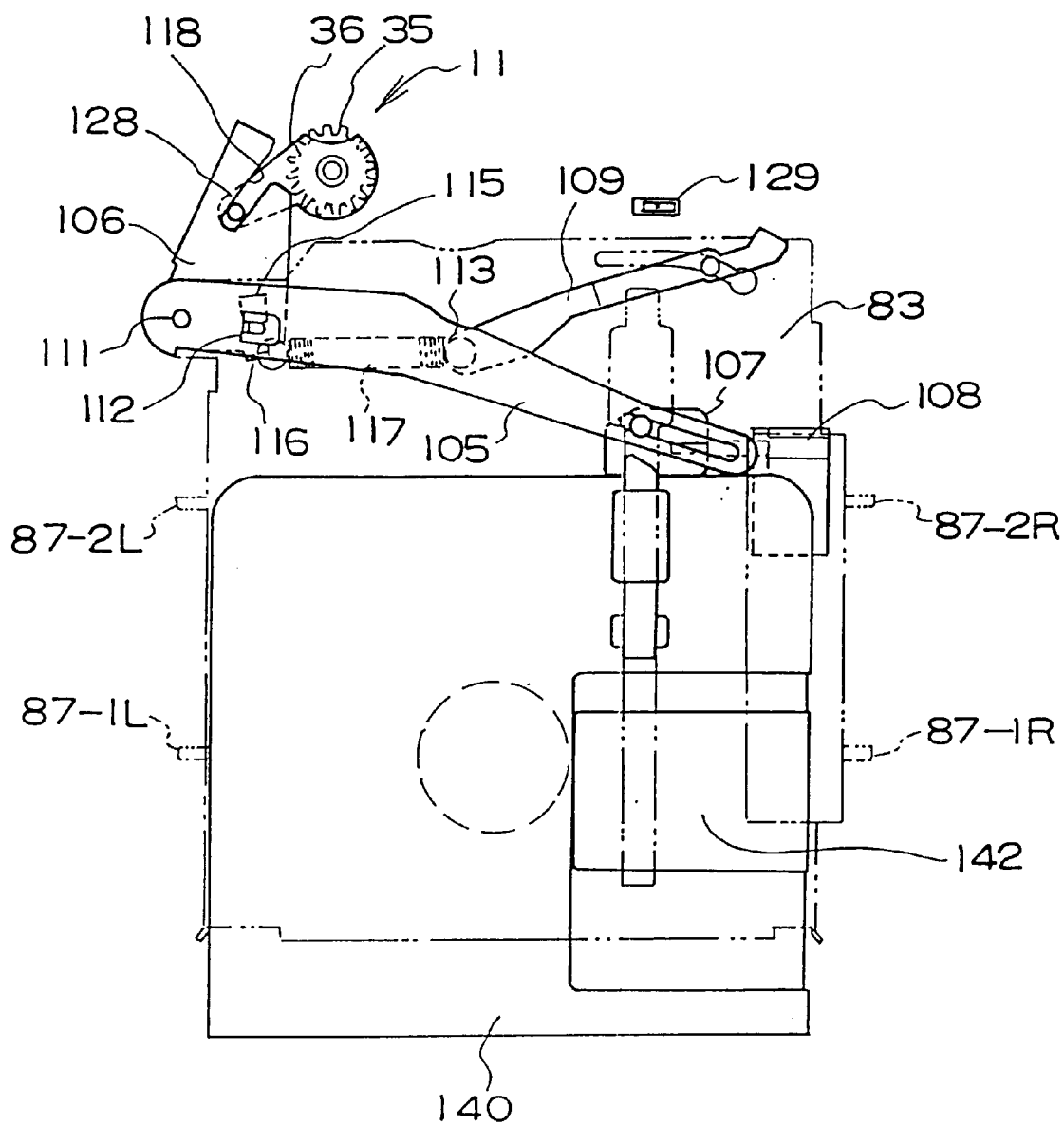
FIG. 15 is an explanatory diagram of the disc player during the loading operation.

As shown in FIG. 15, according to the rotation of the swing arm 36, the slide pin 128 of the swing arm 36 slides in the engaging part 118 so that the sub loading arm 106 is rotated in the counterclockwise direction as well as the loading arm 105 is rotated in the counterclockwise direction for pushing in the catch member 108 and pulling in the disc cartridge 140. In this case, the shutter releasing nail 102 opens the shutter 142 of the disc cartridge 140.

Figure 16:
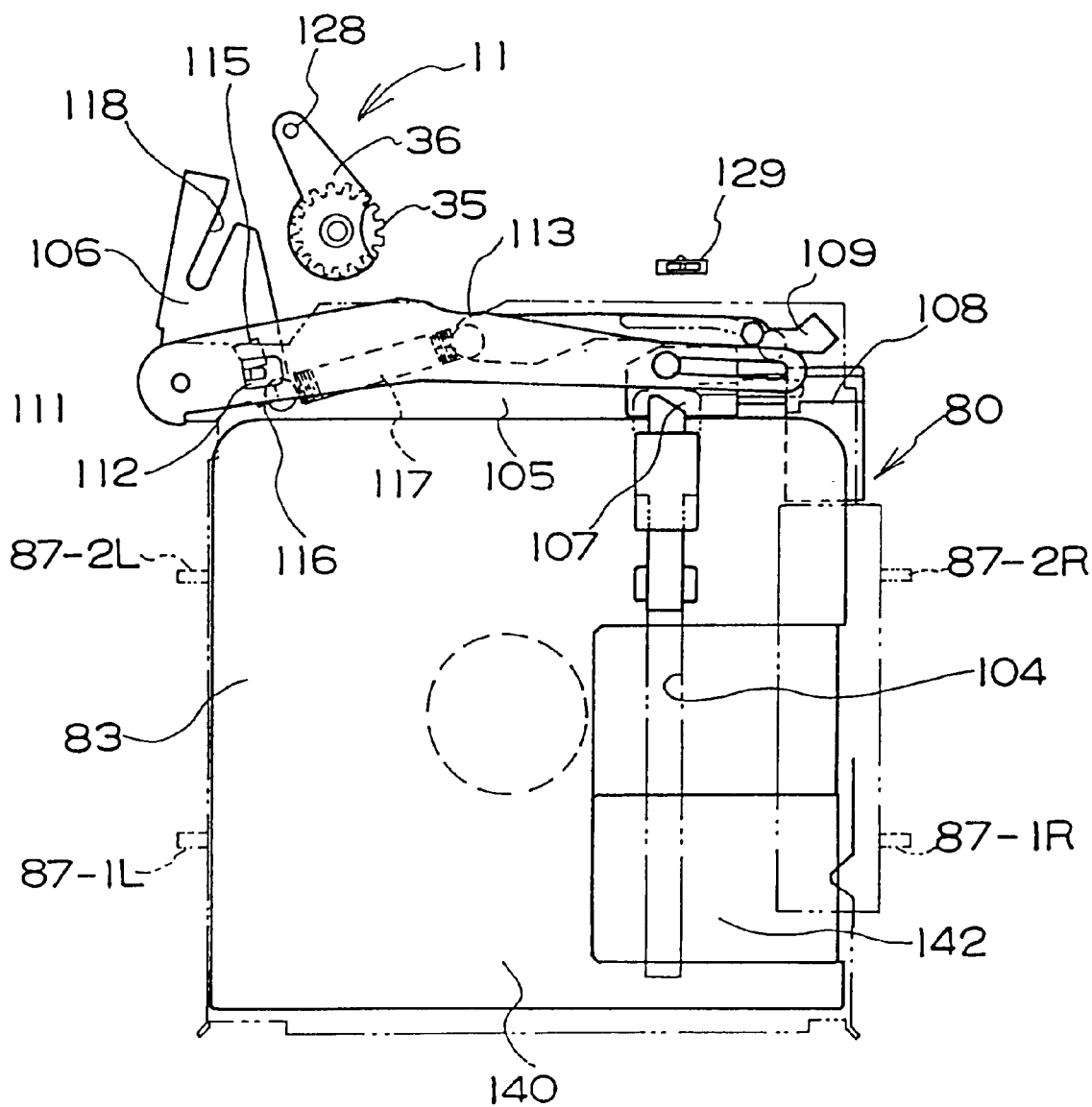
FIG. 16 is an explanatory diagram of the disc player with the drive unit detached from the driving system.

Accordingly, when the disc cartridge 140 is pulled in at a predetermined position (loading finish position), the slide pin 128 of the swing arm 36 is detached from the engaging part 118 of the sub loading arm 106 so that the drive unit 80 is separated from the rotation driving system 11 as shown in FIG. 16.

According to the clockwise rotation of the swing arm 36, as shown in FIG. 17, the mode plate 44 is moved leftward via the rack member 57 engaged with the rack gear 35 integrated with the swing arm 36.

Until the operation of pulling in the disc cartridge 140 is completed as shown in FIG. 16, the slide pins 55 and 56 of the mode plate 44 are moved only in the slide hole parts 45B and 69 of the left and right lock links 45L and 45R without releasing the lock of the drive plate 81. After completion of the operation of pulling in the disc cartridge 140, the slide pins 55 and 56 of the mode plate 44 rotate the left and right lock links 45L and 45R backward so that the left and right lock plates 46L and 46R are moved in the lock releasing direction (backward) (see FIGS. 17 and 18).

According to the movement of the left and right lock plates 46L and 46R in the lock releasing direction (backward), the left and right slide plates 82L and 82R are pulled by the force of the spring members 122L and 122R so as to be moved backward. The guide pins 103-1L, 103-2L, 103-1R and 103-2R are guided by the elevating slide hole parts 98-1L, 98-2L, 98-1R and 98-2R of the left and right slide plates 82L and 82R so that the cartridge holder 83 descends for completing the mounting operation of the disc cartridge 140. Thereafter, the left and right lock plates 46L and 46R are moved further in the lock releasing direction (backward) so as to release the lock of the drive plate 81 for completing the loading operation (see FIGS. 12 and 19).

Next, the flow of the drive unit 80 from the floating state to the locked state will be explained.

(Lock Operation) (Eject Operation)

Figure 20:
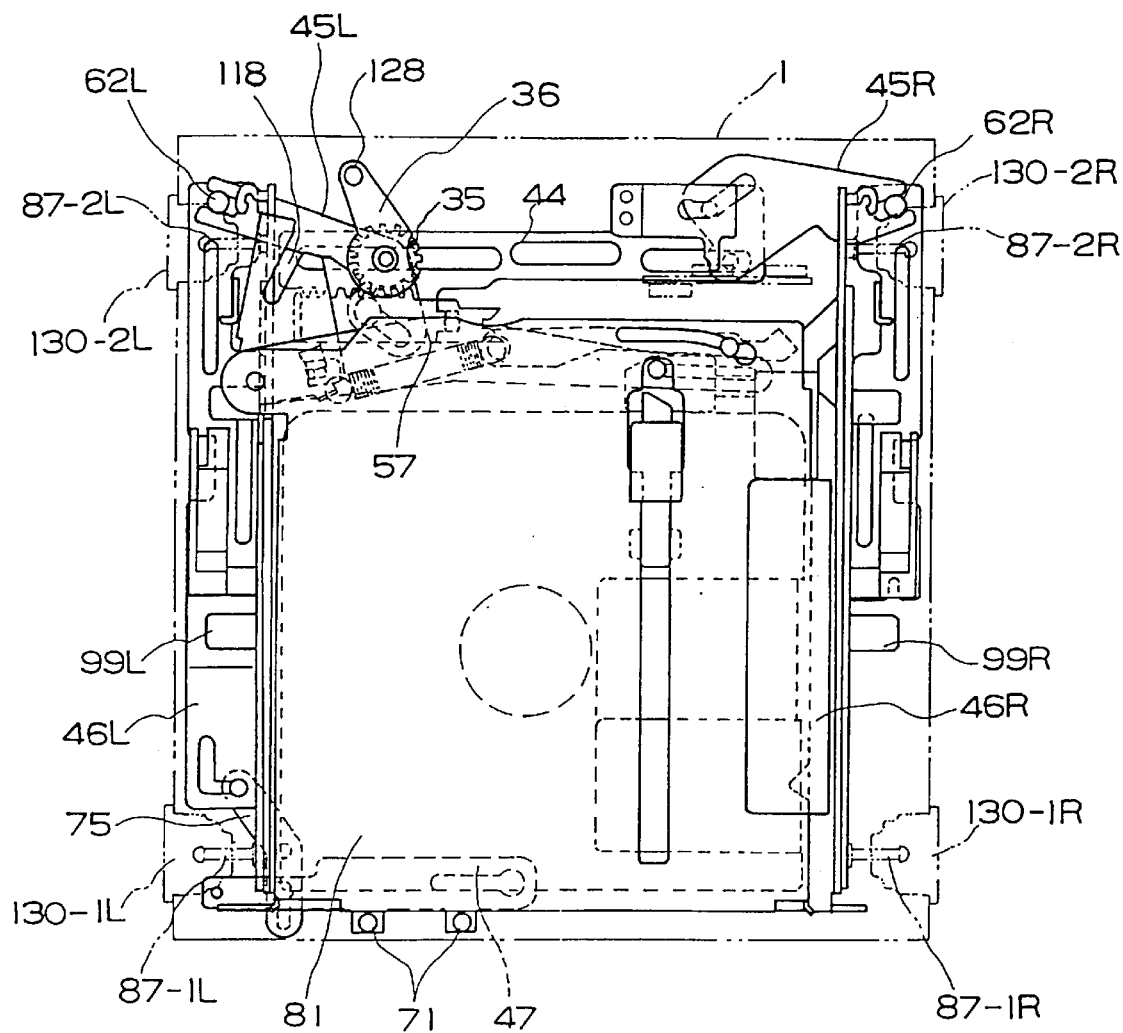
FIG. 20 is an explanatory diagram for the lock operation of the front part of the drive unit in the disc player.
Figure 21:
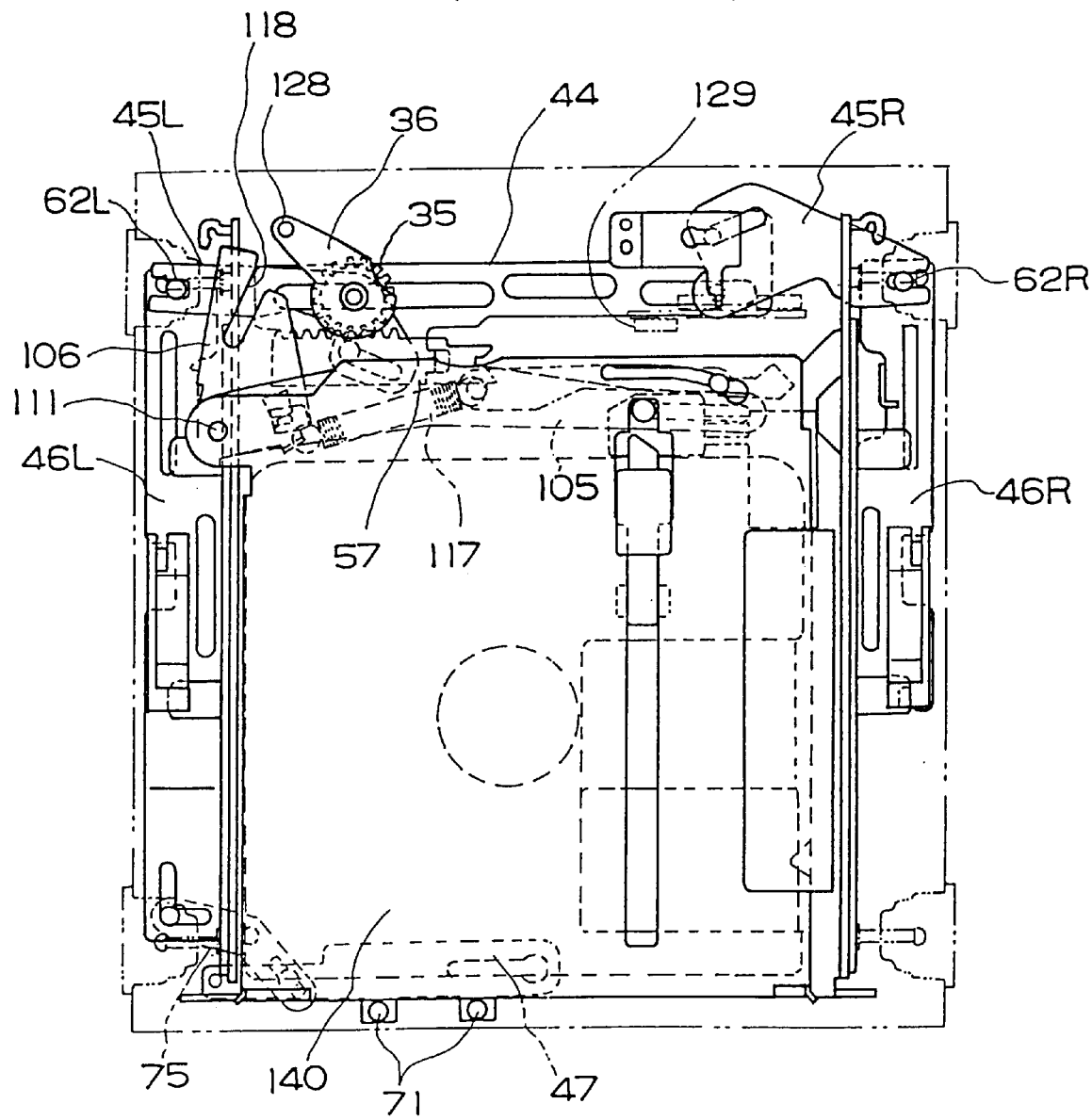
FIG. 21 is an explanatory diagram for the lock operation of the front part of the drive unit in the disc player.
Figure 22:
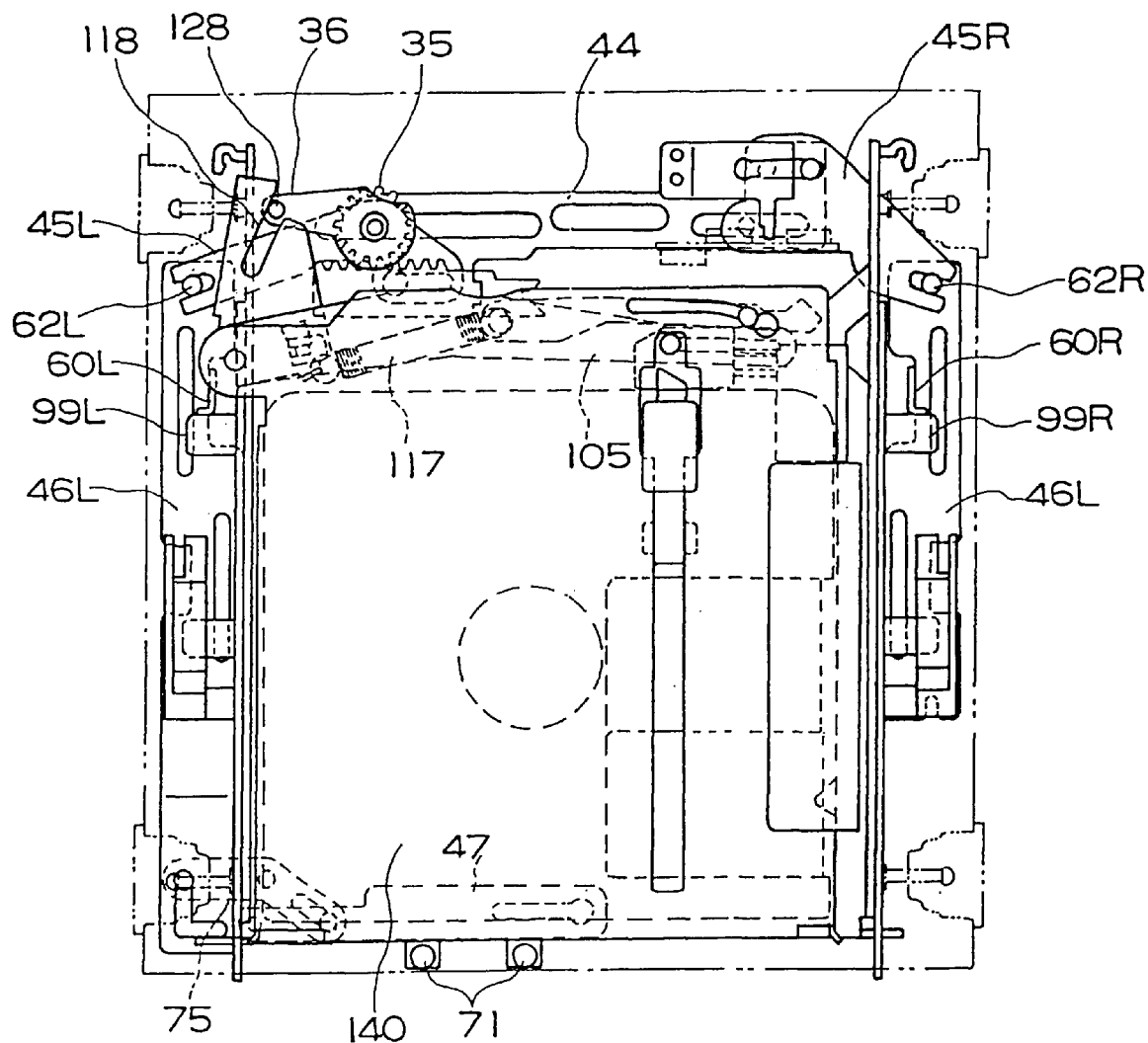
FIG. 22 is an explanatory diagram for the lock operation of both side parts of the drive unit in the disc player.

According to the counterclockwise rotation of the swing arm 36, the mode plate 44 is moved rightward via the rack member 57 engaged with the rack gear 35 integrated with the swing arm 36 so that the left and right lock links 45L, 45R are rotated. According to the rotation of the left lock link 45L, the left lock plate 46L is moved forward as well as according to the rotation of the right lock link 45R, the right lock plate 46R is moved forward. Moreover, according to the forward movement of the left lock plate 46L, the front lock plate 47 is moved rightward via the interlocking link 75 so that the two lock pins 71 held by the front lock plate 47 press the front end part of the drive plate 81 (see FIGS. 20 and 21).

Figure 23:
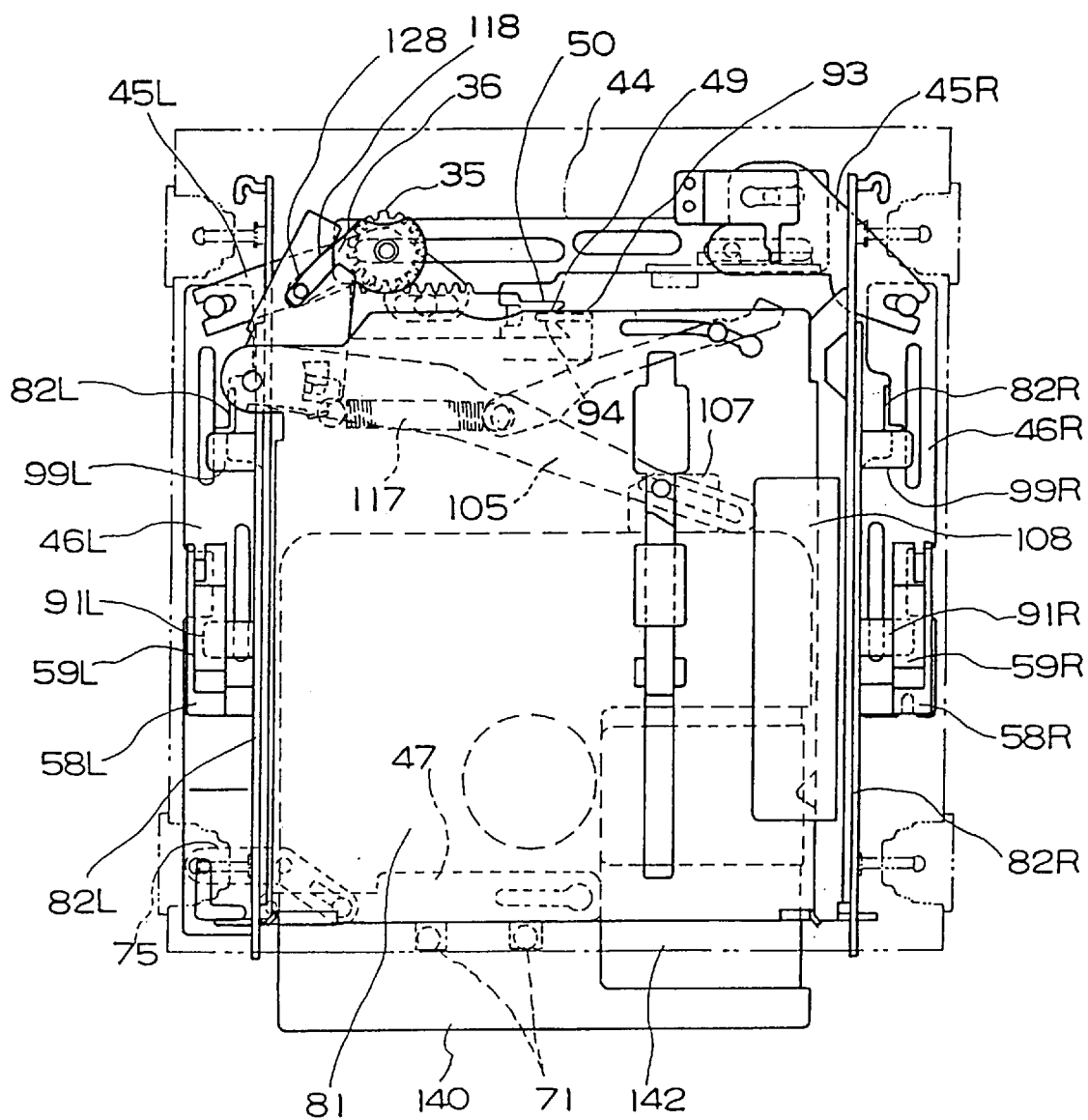
FIG. 23 is an explanatory diagram for the lock operation of the back part of the drive unit in the disc player.

According to the further counterclockwise rotation of the swing arm 36, the left and right lock plates 46L and 46R are moved forward so as to insert the left and right locked nail parts 92L and 92R of the drive plate 81 completely into the lock groove parts 59L and 59R of the lock blocks 58L, 58R held by the lock plates 46L and 46R. Accordingly, the drive plate 81 is held by the left and right lock plates 46L and 46R. At the same time, the left and right slide plates 82L and 82R are pressed at the lever parts 99L and 99R thereof by the projection parts 60L and 60R of the left and right lock plates 46L and 46R so as to be moved forward, resisting to the spring force of the spring members 122L and 122R so that the guide pins 103-1L, 103-2L, 103-1R and 103-2R are guided by the elevating slide hole parts 98-1L, 98-2L, 98-1R and 98-2R of the left and right slide plates 82L and 82R for elevating the cartridge holder 83. At the time, the tip end parts (front end part) of the left and right slide plates 82L and 82R are engaged detachably with the left and right stopping holes 5L and 5R of the front side wall part 1C of the base frame 1. The rotation operation of the lock links 45L and 45R is finished here, and in the following operation, the slide pins 55 and 56 of the mode plate 44 move the slide hole parts 45B and 69 of the lock links 45L and 45R for preventing rotation (see FIG. 23).

Next, according to the counterclockwise rotation of the swing arm 36, the slide pin 128 of the swing arm 36 enters into the engaging part 118 of the sub loading arm 106 so as to rotate the loading arm 105 for discharging the disc cartridge 140. At the time, the engaging groove part 49 of the lock nail part 50 of the mode plate 44 and the engaging groove part 94 of the back side locked nail part 93 of the drive plate 81 are engaged with each other so as to lock the drive plate 81 (see FIG. 23).

Figure 24:
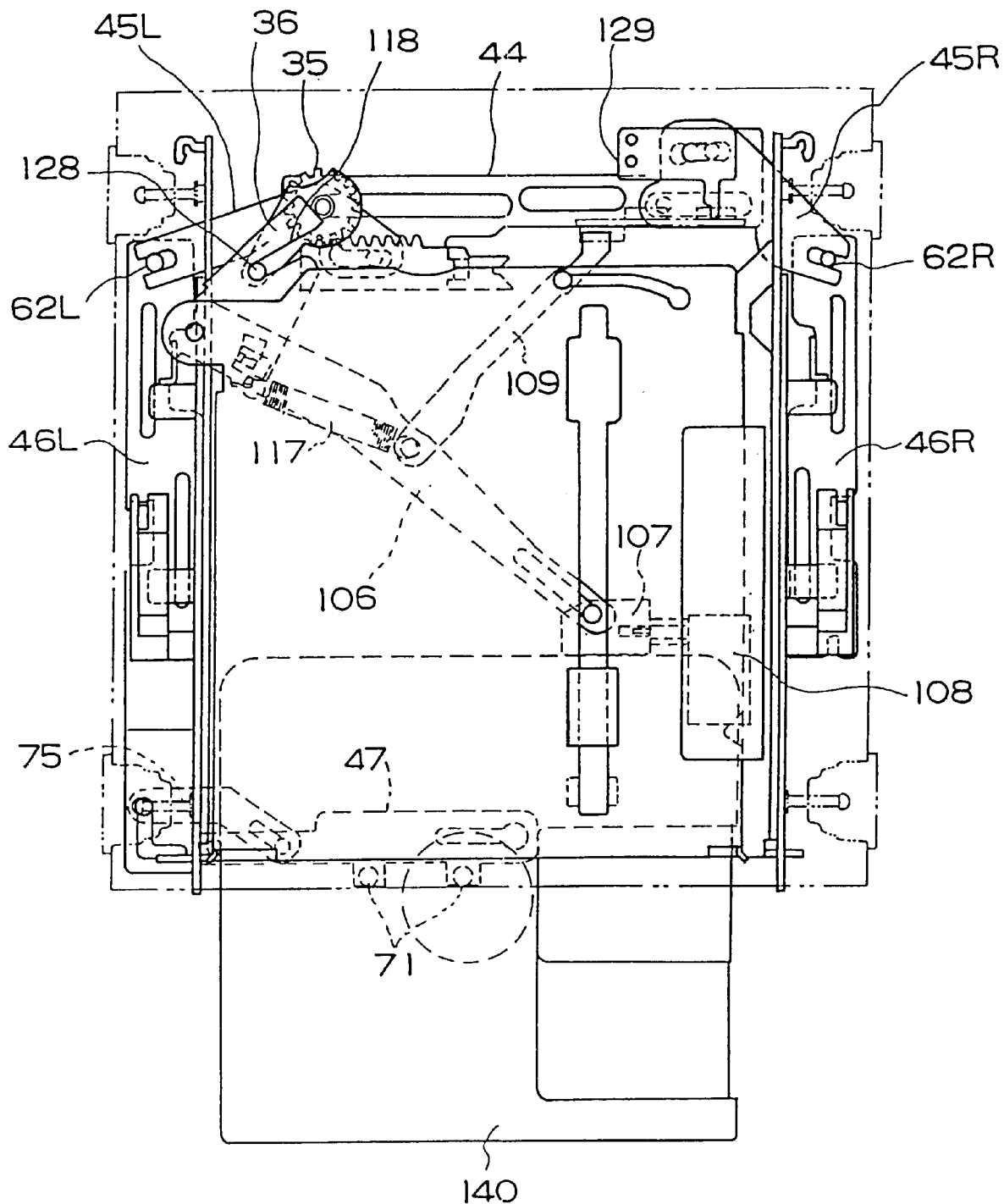
FIG. 24 is an explanatory diagram for the drive unit lock operation after completing the discharge of the disc cartridge in the disc player.

According to the counterclockwise rotation of the swing arm 36, the loading arm 105 is rotated so that the slider 107 and the catch member 108 are moved to the cartridge discharge finish position (see FIG. 24).

Figure 25:
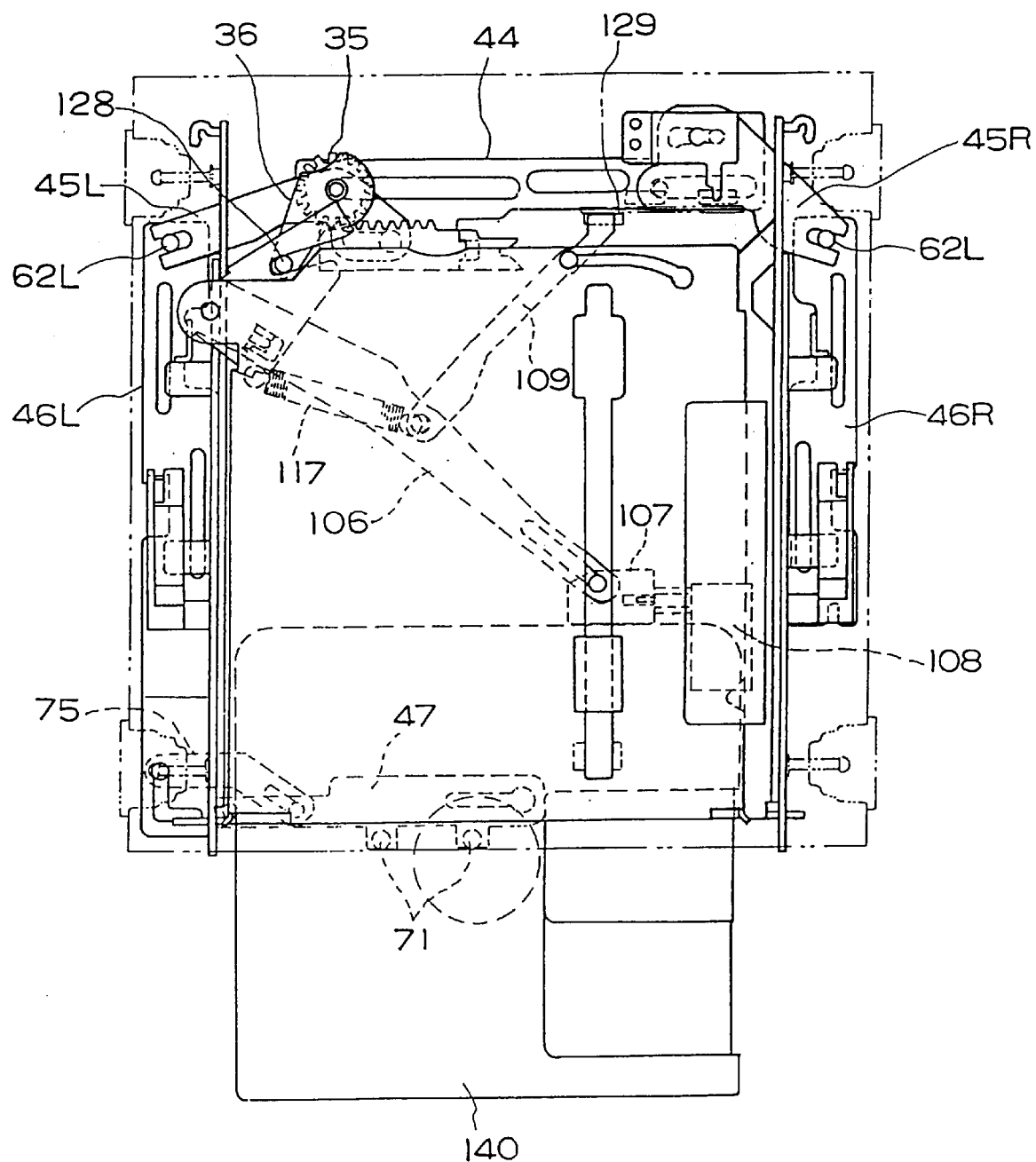
FIG. 25 is an explanatory diagram for the drive unit lock operation after completing the discharge of the disc cartridge in the disc player.
Figure 26:
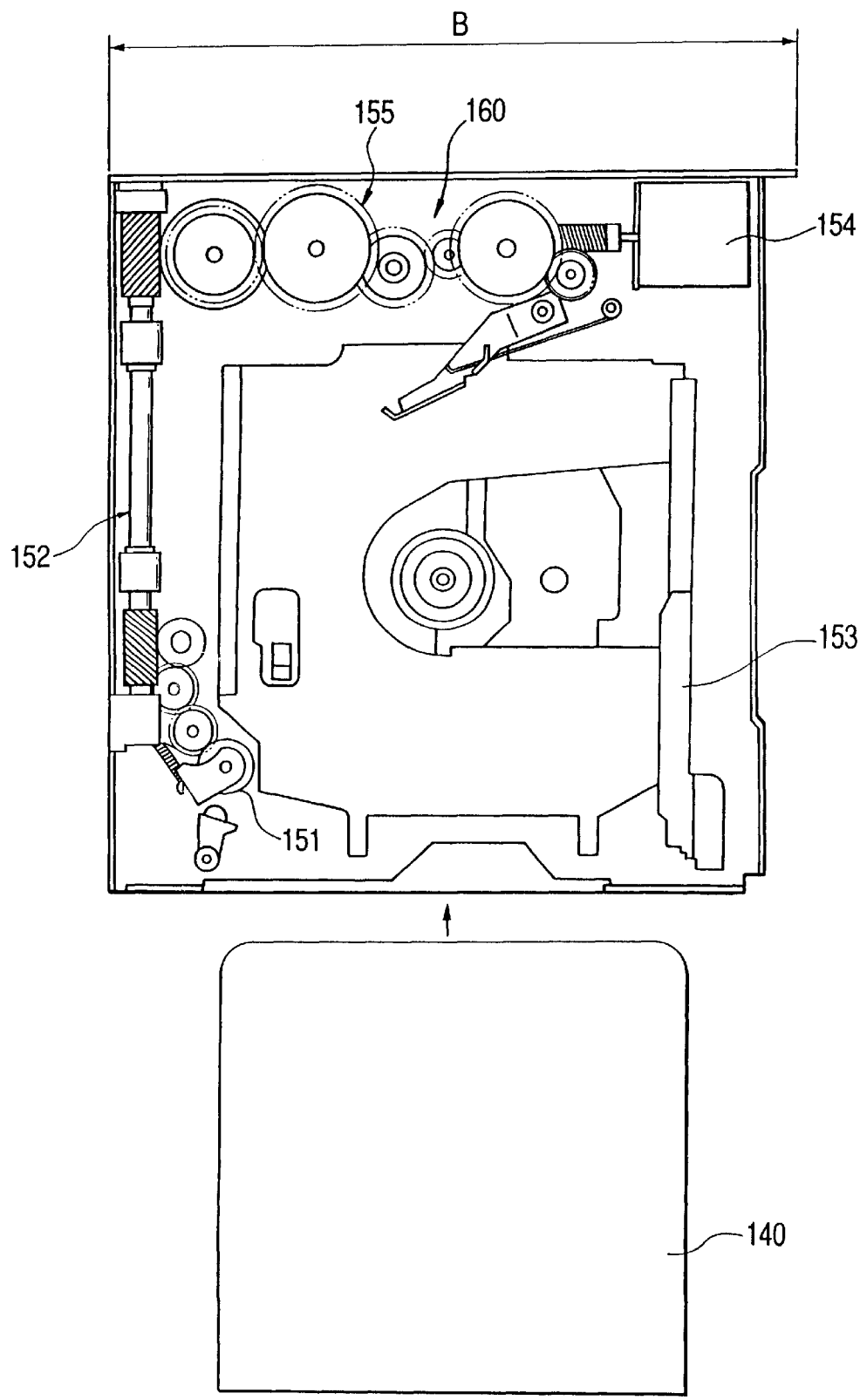
FIG. 26 is a plan view of a conventional disc player with a cover member detached.

Furthermore, since the counterclockwise rotation of the swing arm 36 continues with the loading arm 105 stopped at the maximum movable position, only the sub loading arm 106 is moved so as to expand the spring member 117. The mode plate 44 detects the off operation position by the switch 129 so that the rotation of the swing arm 36 is stopped for completing the lock operation of the drive plate 81 (see FIG. 25).

In this case, since the sub loading arm 106 and the loading arm 105 are fixed with respect to the swing arm 36 owing to the tension by the spring member 117, the entirety of the drive unit 80 can be pressed for locking the drive unit 80 without backlash.

As heretofore explained, according to the disc player of the first aspect of the invention, when the disc cartridge is inserted into the cartridge holder of the drive unit, the disc cartridge is held by the catch member and the rotation driving source is driven so as to rotate the swing arm for rotating the loading arm according to the rotation of the swing arm so that the disc cartridge is introduced via the catch member for loading. Since the rotating swing arm is used for the rotating operation of the loading arm, the loading speed of the disc cartridge can be high. Moreover, since a roller for loading is not used, the loading motor and the rotation transmitting system (gear row and rotation transmitting mechanism part) for driving the roller for loading need not be provided from the back side to the left side with respect to the drive unit. Therefore, the structure can be simple as well as the width size of the disc player can be small with a small number of components.

Moreover, according to the disc player of the second aspect of the invention, the same effects as in the first aspect can be achieved as well as since the gear is adhered to the swing arm with the axis provided concentrically with the rotation center of the swing arm, backlash of the swing arm can be eliminated in the rotation driving system of the swing arm so that the operation error derived from the backlash of the swing arm can be eliminated.

Furthermore, according to the disc player of the third aspect of the invention, the same effects as in the first aspect can be achieved as well as since the notch part for avoiding the interference with respect to the gears in the gear row is provided in the swing arm, even after disposing the swing arm supported by a supporting part rotatably, by rotating the swing arm so as to have the notch part thereof oriented toward a supporting part supporting a gear in the gear row, the gear in the gear row can be supported by the supporting part without interference by the swing arm, and further, by rotating the swing arm so as to have the notch part thereof oriented toward another supporting part supporting another gear in the gear row, the other gear in the gear row can be supported by the other supporting part without interference by the swing arm, and thus the assembly operativity can be improved.

Moreover, according to the disc player of the fourth aspect of the invention, the same effects as in the first aspect can be achieved as well as since the peripheral part (four side parts) of the drive unit can be locked by a plurality of (four) peripheral lock means as well as the entirety of the drive unit can be pressed by the elastic lock means in the case of locking the drive unit on the base member, the drive unit can be locked without backlash.

Furthermore, according to the disc player of the fifth aspect of the invention, the same effects as in the first aspect can be achieved as well as since the front surface part of the drive unit is pressed with the pressing member provided in the front lock plate, the mode plate side lock part is engaged detachably with the lock part at the back side with respect to the drive unit, the one lock plate side lock part is engaged detachably with the one side lock part of the drive unit, and the other lock plate side lock part is engaged detachably with the other side lock part of the drive unit in the case of locking the drive unit on the base member, the four sides of the drive unit can be locked, respectively, and thus the drive unit can be locked without backlash.

Moreover, according to the disc player of the sixth aspect of the invention, the same effects as in the first aspect can be achieved as well as the loading arm is rotated, interlocking with the sub loading arm according to the rotation of the swing arm of the loading means at the time of loading the disc cartridge such that the loading arm is stopped at the maximum rotation position but only the sub loading arm tensions the spring member by its rotation by the rotation tolerating means according to the further rotation of the swing arm. Because the sub loading arm and the loading arm are fixed with respect to the swing arm according to the tension of the spring member, the entirety of the drive unit can be pressed so that the drive unit can be locked without backlash.

What is claimed is:

1. A disc player comprising:
    a base member;
    a floating means;
    a drive unit including a drive plate having a record reproducing means, the drive plate held by the base member via the floating means, and a cartridge holder held by the drive plate movably to a side of the record reproducing means;
    a loading means for moving a disc cartridge to the side of the record reproducing means by inserting the disc cartridge into the cartridge holder of the drive unit;
    an eject means for ejecting the disc cartridge after reproducing record in the disc cartridge;
    a lock means for locking the drive unit on the base member in the process from the reproduction of the record of the disc cartridge to the ejection of the disc cartridge; and a lock releasing means for releasing a lock by the lock means in loading the disc cartridge, wherein the loading means comprises:

a catch member for gripping the disc cartridge inserted in the cartridge holder;

a loading arm for introducing the catch member for moving the disc cartridge to a side of the record reproducing means; and a swing arm to be rotated by drive of a rotation driving system provided on the base member for rotating the loading arm, the swing arm to be separated from a side of the loading arm when the loading operation of the disc cartridge is finished.

2. The disc player according to claim 1, further comprising:

a first gear fixed to the swing arm having an axis provided concentrically with a rotation center of the swing arm; and a gear row including a plurality of second gears for linking the first gear with an output gear of a loading motor to form the rotation driving system for the swing arm, wherein the swing arm and the rotation driving system are disposed outward with respect to one side of the drive unit.

3. The disc player according to claim 2, wherein the swing arm comprises a notch part for avoiding interference with respect to the plurality of second gears in the gear row.

4. The disc player according to claim 1, wherein the lock means comprises:

a plurality of peripheral lock means for locking the peripheral part of the drive unit; and an elastic lock means for pressing the entirety of the drive unit.

5. The disc player according to claim 4, further comprising:

a mode plate moving in the direction perpendicular to the loading direction of the disc cartridge according to the rotation of the swing arm, the mode plate comprising a mode plate side lock part to be engaged detachably with a lock part of the drive unit when the mode plate moves;

first lock plate moving in the loading direction according to the movement of the mode plate, the first lock plate comprising a first lock plate side lock part to be engaged detachably with a first side lock part of the drive unit when the first lock plate moves;

second lock plate moving in the loading direction according to the movement of the mode plate, the second lock plate comprising a second lock plate side lock part to be engaged detachably with a second lock part of the drive unit when the second lock plate moves; and a front lock plate moving in the direction perpendicular to the loading direction according to the movement of the first lock plate, the front lock plate comprising a pressing member for pressing one side of the drive unit when the front lock plate moves, wherein the peripheral lock means comprises the lock part, the first lock plate side lock part, the second lock plate side lock part, and the pressing member.

6. The disc player according to claim 4, wherein the elastic lock means comprises:

a sub loading arm rotating by the rotation of the swing arm, the sub loading arm mounted at the drive unit rotatably by the same fulcrum as that of the loading arm; and a rotation allowing means for allowing the loading arm to rotate by a predetermined rotation angle in maximum with respect to the sub loading arm, the rotation allowing means comprising a spring member for linking a tip of the sub loading arm with a middle part of the loading arm, wherein the sub loading arm is rotated by the predetermined rotation angle by spring force of the spring member to interlock with the loading arm.

7. A disc player comprising:

a base member;

a floating member;

a drive unit including a drive plate having a record reproducer, the drive plate held by the base member via the floating member, and a cartridge holder held by the drive plate movably to a side of the record reproducer;

a loading mechanism for moving a disc cartridge to the side of the record reproducer by inserting the disc cartridge into the cartridge holder of the drive unit;

an ejector for ejecting the disc cartridge after reproducing a record in the disc cartridge; and a lock for locking the drive unit on the base member in the process from the reproduction of the record of the disc cartridge to the ejection of the disc cartridge.

8. The disc player according to claim 7, further comprising:

a lock release unit for releasing the locking by the lock in loading the disc cartridge.

9. The disc player according to claim 7, wherein said loading mechanism comprises:

a catch member for gripping the disc cartridge inserted in the cartridge holder;

a loading arm for introducing the catch member for moving the disc cartridge to a side of the record reproducer; and a swing arm to be rotated by drive of a rotation driving system provided on the base member for rotating the loading arm, the swing arm to be separated from a side of the loading arm when the loading operation of the disc cartridge is finished.

10. The disc player according to claim 9, further comprising:

a first gear fixed to the swing arm having an axis provided concentrically with a rotation center of the swing arm; and a gear row including a plurality of second gears for linking the first gear with an output gear of a loading motor to form the rotation driving system for the swing arm.

11. The disc player according to claim 9, wherein the swing arm and the rotation driving system are disposed outwardly with respect to one side of the drive unit.

12. The disc player according to claim 10, wherein the swing arm comprises a notch portion for avoiding interference with respect to the plurality of second gears in the gear row.

13. The disc player according to claim 9, wherein the lock comprises:

a plurality of peripheral locks for locking a peripheral part of the drive unit; and an elastic lock for pressing an entirety of the drive unit.

14. The disc player according to claim 13, further comprising:

a mode plate moving in a direction perpendicular to the loading direction of the disc cartridge according to the rotation of the swing arm, the mode plate comprising a mode plate side lock part to be engaged detachably with a lock part of the drive unit when the mode plate moves;

a first lock plate moving in the loading direction according to movement of the mode plate, the first lock plate comprising a first lock plate side lock part to be engaged detachably with a first side lock part of the drive unit when the first lock plate moves; and a front lock plate moving in the direction perpendicular to the loading direction according to the movement of the first lock plate, the front lock plate comprising a pressing member for pressing one side of the drive unit when the front lock plate moves.

15. The disc player according to claim 14, further comprising:

a second lock plate moving in the loading direction according to the movement of the mode plate, the second lock plate comprising a second lock plate side lock portion to be engaged detachably when the second lock plate moves.

16. The disc player according to claim 15, wherein each of said plurality of peripheral locks comprises a lock portion, the first lock plate side lock part, the second lock plate side lock portion, and the pressing member.

17. The disc player according to claim 13, wherein the elastic lock comprises:

a sub loading arm rotating by the rotation of the swing arm, the sub loading arm mounted at the drive unit rotation of the swing arm, the sub loading arm mounted at the drive unit rotatably by a same fulcrum as that of the loading arm; and a rotation allowing device for allowing the loading arm to rotate by a predetermined rotation angle in maximum with respect to the sub loading arm, the rotation allowing device comprising a spring member for linking a tip of the sub loading arm with a middle part of the loading arm.

18. The disc player according to claim 17, wherein the sub loading arm is rotated by the predetermined rotation angle by spring force of the spring member to interlock with the loading arm.

* * * * *